(12) United States Patent
Takata

(10) Patent No.: US 8,752,996 B2
(45) Date of Patent: Jun. 17, 2014

(54) LIGHTING DEVICE, DISPLAY DEVICE AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 177 days.

(21) Appl. No.: 13/519,392

(22) PCT Filed: Dec. 2, 2010

(86) PCT No.: PCT/JP2010/071543
§ 371 (c)(1),
(2), (4) Date: Jun. 27, 2012

(87) PCT Pub. No.: WO2011/083641
PCT Pub. Date: Jul. 14, 2011

(65) Prior Publication Data
US 2012/0293716 A1    Nov. 22, 2012

(30) Foreign Application Priority Data
Jan. 7, 2010  (JP) ................................ 2010-002077

(51) Int. Cl.
*G02B 6/00*    (2006.01)

(52) U.S. Cl.
USPC ............................. 362/612; 362/613; 362/631

(58) Field of Classification Search
USPC ............ 362/612, 613, 630, 631, 97.3, 249.02
See application file for complete search history.

(56) References Cited

U.S. PATENT DOCUMENTS

| 2007/0170452 A1 | 7/2007 | Kurokawa et al. | |
| 2007/0274086 A1 | 11/2007 | Takeda et al. | |
| 2008/0232134 A1* | 9/2008 | Weng et al. | 362/612 |
| 2011/0176332 A1* | 7/2011 | Nam et al. | 362/613 |
| 2011/0273631 A1* | 11/2011 | Hayashi | 348/790 |
| 2011/0273642 A1* | 11/2011 | Kweon et al. | 349/62 |
| 2012/0069262 A1* | 3/2012 | Kang et al. | 349/58 |
| 2012/0146543 A1* | 6/2012 | Jang et al. | 315/294 |

FOREIGN PATENT DOCUMENTS

| JP | 11-133394 A | 5/1999 |
| JP | 2004-055160 A | 2/2004 |
| JP | 2007-305435 A | 11/2007 |
| JP | 2007-317589 A | 12/2007 |
| JP | 2009-140685 A | 6/2009 |

OTHER PUBLICATIONS

Official Communication issued in International Patent Application No. PCT/JP2010/071543, mailed on Feb. 15, 2011.

* cited by examiner

*Primary Examiner* — Laura Tso
(74) *Attorney, Agent, or Firm* — Keating & Bennett, LLP

(57) ABSTRACT

An object is to improve a reliability of an electrical connection in a lighting device. A backlight unit 12 in accordance with the present invention is provided with an LED board 18 which has an LED 17 serving as a light source and is formed in an elongated shape, a chassis 14 in which the LED board 18 is accommodated, a light guide member 19 in which an end portion is arranged opposite to the LED 17 of the LED board 18, and a connector 20 mounted to the chassis 14 and configured to establish electrical connection with an external device, the LED board 18 is provided with a terminal 18*b* which is electrically connected to the LED 17, and the connector 20 includes a connection terminal 28 being in contact with the terminal 18*b* of the LED board 18 and slidable along a long-side direction of the LED board 18 and relative to the terminal 18 of the LED board 18.

27 Claims, 13 Drawing Sheets

FIG.1
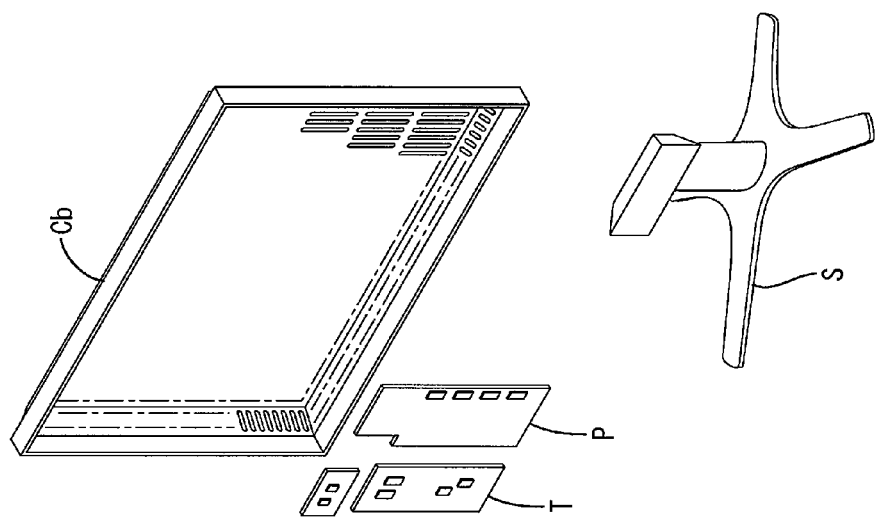
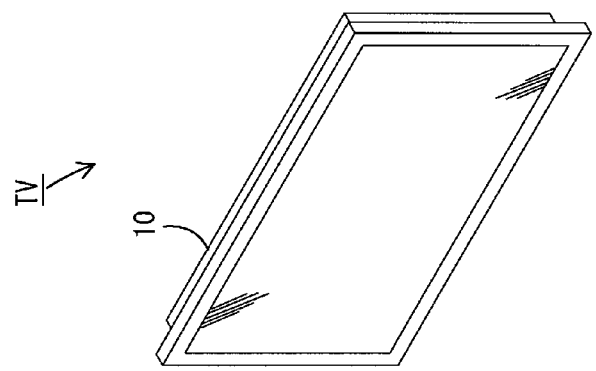
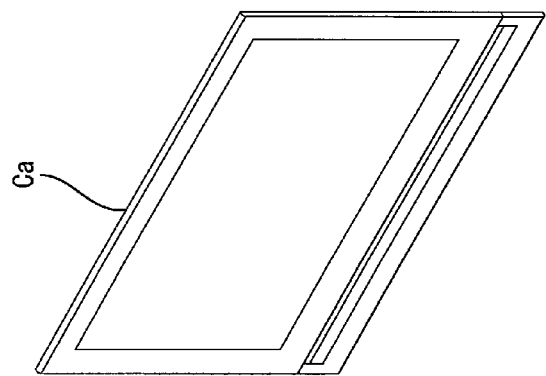

US 8,752,996 B2

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, a display element of an image display device such as a television receiver is giving way to a thin type display panel such as a liquid crystal panel or a plasma display panel from a conventional Braun tube, and can make an image display device thin. The liquid crystal display device separately requires a backlight unit as a lighting device since a liquid crystal panel used therein does not self-emit light. The backlight unit is broadly classified into a direct type and an edge light type on the basis of its mechanism. In order to achieve a much thinner structure of the liquid crystal display device, it is preferable to use the edge light type backlight unit, and a structure described in the following Patent Document 1 has been known as one example thereof.

The backlight unit described in the Patent Document 1 is provided with a light guide plate, an LED located opposite to an end portion of the light guide plate, an LED board on which the LED is mounted, and a lead frame that electrically connects the LED board to a power supply circuit board in an external device. The lead frame is structured such that a clip shaped terminal formed in one end side is soldered to the LED board, and a tabular terminal formed in the other end side is soldered onto the power supply circuit board in the external device, thereby relaying a power supply to the LED board.

Patent Document 1: Japanese Unexamined Patent Publication No. 11-133394

Problem to be Solved by the Invention

In recent years, size of a screen of a liquid crystal display device has been increased, and therefore size of each constituent member of the liquid crystal display device has also been increased. Further, since it is necessary to increase the number of light sources installed in the backlight unit, a calorific power of the entire backlight unit tends to be increased. As a result, in the large-sized liquid crystal display device, a temperature environment within the backlight unit changes greatly in connection with a use of the device, and an amount of expansion or contraction caused by a thermal expansion or a thermal contraction of each constituent member becomes enlarged accordingly.

In the structure described in the Patent Document 1, the soldering is employed as a method of connecting the lead frame to the LED board and to the power supply circuit board. In this case, when the temperature environment within the backlight unit greatly changes due to the size increase, a great relative displacement is generated between the power supply circuit board and the LED board due to a difference of a coefficient of thermal expansion therebetween. As a result, a stress acts on the soldered portion so as to generate a crack, and there is a possibility that a reliability of an electrical connection is lowered. In other words, in the Patent Document 1, it is an actual condition that a sufficient study has not been made with regard to a countermeasure for the size increase and the calorific power increase.

Disclosure of the Present Invention

The present invention was made in view of the foregoing circumstances. An object of the present invention is to enhance a reliability of an electrical connection.

Means for Solving the Problem

A lighting device in accordance with the present invention includes an elongated light source board including a light source, a chassis housing the light source board, a light guide member having an end portion arranged opposite to the light source of the light source board, and a connector mounted to the chassis and configured to establish electrical connection with an external device, the connector holding the light source board. The light source board includes a terminal electrically connected to the light source, and the connector includes a connection terminal being in contact with the terminal of the light source board and slidable along a long-side direction of the light source board and relative to the terminal of the light source board.

As mentioned above, if the connector mounted to the chassis holds the light source, the electrical connection with external device is established, and the light source of the light source board is kept in the state of being arranged opposite to the end portion of the light guide member. In the case that the light source board expands or contracts in the long side direction in accordance with the thermal expansion or the thermal contraction, there has been conventionally a risk that a stress acts on the soldered portion and a crack is generated, since the lead frame is soldered to the light source board. In comparison with this, in accordance with the present invention, since the connection terminal and the terminal can be relatively slid in the long side direction of the light source board while maintaining the contact state with each other, it is possible to avoid a generation of a loose connection. Particularly, in the case that the lighting device is increased in size, the light source board tends to be extended in the long-side direction. In connection with it, since the amount of expansion or contraction is also increased in accordance with the thermal expansion or the thermal contraction, the present invention can be said to be preferable from the viewpoint of the size increase.

The following structures are preferable as modes for carrying out the present invention.

(1) The terminal may have a dimension wider than a dimension of the connection terminal, the dimension of the terminal and the dimension of the connection terminal measuring in the long-side direction of the light source board. In accordance with this, since the terminal is made relatively wider in the long side direction even in the case that the light source board expands or contracts in the long-side direction in accordance with the thermal expansion or the thermal contraction, and the terminal and the connection terminal are relatively slid in the long side direction, it is possible to well maintain a contact state of the connection terminal. In this case, since the terminal is formed in the elongated light source board, in spite of being wider as mentioned above, it is possible to easily secure an installing space without increasing the size of the light source board. On the contrary, since it is possible to make the connection terminal in the connector side relatively narrower, it is possible to avoid a size increase of the connector.

(2) The connector may have a pair of walls arranged opposite to each other such that an insertion groove is provided between the walls for receiving the light source board. In accordance with this, since the light source board is sandwiched between a pair of walls by inserting the light source board into the insertion groove of the connector, retention is achieved.

(3) The connection terminal may have a contact portion that is in contact with the terminal, the contact portion being shaped so as to project from one of the walls toward the light source board. In accordance with this, in a state in which the contact position of the connection terminal projecting from one of the walls being in contact with the terminal, since the light source board is received by the other wall portion which is arranged in a side opposite to the connection terminal, it is possible to obtain a good contact state.

(4) The insertion groove may have an opening extending along a short-side direction of the light source board. In accordance with this, it is possible to insert the light source board to the connector along the short-side direction.

(5) The connector may have a receiving surface at a bottom of the insertion groove, the receiving surface receiving the light source board. In accordance with this, since it is possible to regulate an insertion depth of the light source board with respect to the connector, it is possible to position the light source board with respect to the inserting direction to the connector. At this time, it is possible to position the light source of the light source board with respect to the end portion of the light guide member, whereby it is possible to make the light from the light source well incident to the light guide member.

(6) The insertion groove may have an opening extending along the long-side direction of the light source board. In accordance with this, since the light source board can expand and contract freely in the long-side direction in a state of being inserted into the insertion groove, it is possible to avoid a generation of a stress in the light source board and a deformation at a time when the thermal expansion or the thermal contraction is generated.

(7) The light source board may include a plurality of the light sources arranged parallel to each other in the long-side direction and may have a wiring pattern connecting the light sources in series. In accordance with this, it is possible to drive in series a plurality of the light sources collectively by connecting a plurality of the light sources in series in accordance with the wiring pattern.

(8) The terminal may include a plurality of terminals arranged at one of ends of the light source board and the other end portion side in the long-side direction in the light source board, and the connector may include a pair of connectors, the connector may being arranged at different locations away from each other in the long-side direction so as to correspond to the terminals. In accordance with this, it is possible to drive in series a plurality of the light sources which are connected in series in accordance with the wiring pattern, for example, by setting a connector which is arranged in the one end portion side in the long-side direction in the light source board to an input side, and setting a connector which is arranged in the other end portion side to an output side. Since the terminal and the connector are arranged in each of the terminal sides in the long-side direction in the light source board, it is possible to reduce a distance from the light source positioned at the end in the long-side direction to the terminal in the light source board, whereby it is possible to avoid a vain elongation of the wiring pattern.

(9) The terminal may be arranged at a position displaced from the light source in the short-side direction of the light source board with respect to the light source. In accordance with this, it is possible to downsize the light source board in the long-side direction, in comparison with the case that the terminal and the light source are arranged so as to be displaced each other in the long-side direction of the light source board.

(10) The terminal may be arranged parallel to the light source in the short-side direction. In accordance with this, since it is possible to reduce the distance between the light source and the terminal in comparison with the case that the terminal is arranged at a position displaced from the light source in the long-side direction, the wiring pattern can be made short in the case that, for example, the light source and the terminal are connected in accordance with the wiring pattern.

(11) The light source board may include a plurality of the light sources and a wiring pattern, the light source being arranged parallel to each other in the long-side direction, the wiring pattern connecting the light sources in series, and the terminal may be arranged parallel to the light source in the short-side direction, the light source being at an end of the long side of the light source board. In accordance with this, it is possible reduce a distance of the wiring pattern which is arranged from the light source positioned at the end to the terminal, in comparison with the case that the terminal is arranged closer to the center than the light source which is positioned at the end in the long-side direction. Further, it is possible to downsize the light source board in the long-side direction, in comparison with the case that the terminal is arranged much closer to the end than the light source which is positioned at the end in the long-side direction.

(12) The light source may be arranged on the light source board closer to a first end of the short-side of the light source board, and the terminal may be arranged on the light source board closer to a second end of the short-side direction in the light source board. In accordance with this, it is possible to efficiently arrange the light source and the terminal which are arranged so as to be displaced each other in the short-side direction, in the light source board.

(13) The connector may hold the second end of the short-side of the light source board. In accordance with this, it is possible to keep the connector compact in the short-side of the light source board.

(14) The chassis may have a bottom portion to which the connector is mounted, the bottom portion being arranged away from a light output side with respect to the light source board and the light guide member. The bottom portion may have a light guide member support portion and a connector portion, the light guide member support portion supporting the light guide member and the connector mount portion and a connector mount portion to which the connector is mounted may protrude further outside than the light guide member support portion. Since the light source board is arranged such that the light source and the terminal are relatively deviating in the short-side direction, its size tends to be increased in the short-side direction. In this regard, in accordance with the present invention, since the connector mount portion in the chassis is structured so as to protrude to the outer side than the light guide member support portion, it is possible to sufficiently secure an installing space of the light source board within the chassis.

(15) The connector may be arranged at a position displaced from the light guide member in the short-side direction of the light source board. In accordance with this, it is possible to avoid a mutual interference between the light guide member and the connector.

(16) The terminal may be arranged at a position displaced from the light source in the long-side direction of the light source board. In accordance with this, it is possible to downsize the light source board in the short-side direction, in comparison with the case that the terminal and the light source are arranged so as to be displaced each other in the short-side direction of the light source board. In accordance with this, it is possible to make the entire lighting device thinner.

(17) The terminal may be arranged on a surface of the light source board on which the light source is arranged. In accordance with this, since the terminal and the light source are formed on the same surface in the light source board, the light source board can be formed as a single-side mounted type, and it is possible to reduce a manufacturing cost for the light source board.

(18) The connection terminal may have an elastic contact part which is in elastic contact with the terminal. In accordance with this, it is possible to maintain a contact state with a good contact pressure by bringing the elastic contact part into elastic contact with the terminal.

(19) The chassis may have an mounting hole through which the connector is passed such that the connector is fitted therein. In accordance with this, the light source board within the chassis can be electrically connected to an external device via the connector which is passed through the chassis and fitted into the mounting hole.

(20) The connector may have a connector housing that includes the connection terminal therein and has an insulating property. In accordance with this, it is possible to keep the connection terminal in an insulated state with respect to the chassis by the connector housing.

(21) The connector housing may be made of a synthetic resin, and the connection terminal may be inserted into the connector housing. In accordance with this, it is possible to reduce a manufacturing cost for the connector.

(22) The lighting device may further include a pair of reflection members. The light source and the end portion of the light guide member arranged opposite to the light source may be arranged away from each other with a space therebetween, and the space is sandwiched between the reflection members. In accordance with this, the light emitted from the light source is repeatedly reflected by a pair of the reflection members in the space which is kept between the end portions of the opposed light guide members, thereby being efficiently incident with respect to the end portion of the light guide member. In accordance with this, it is possible to improve an efficiency of utilizing the light.

(23) The light source may be an LED. In accordance with this, it is possible to achieve a higher brightness and a lower electric power consumption.

Next, in order to achieve the object mentioned above, the display device in accordance with the present invention may be provided with the lighting device described above, and a display panel configured to provide display using light from the lighting device.

In accordance with the display device mentioned above, since the lighting device supplying the light to the display panel is structured such that a reliability of an electrical connection is high, it is possible to stably carry out the display.

A liquid crystal panel can be exemplified as the display panel. The display device mentioned above can be applied, as a liquid crystal display device, to various intended uses such as a television and a display of a personal computer, and is particularly preferable for a large-size screen.

Advantageous Effect of the Invention

In accordance with the present invention, a reliability of an electrical connection can be enhanced.

BRIEF DESCRIPTION OF THE DRAWINGS

FIG. 1 is an exploded perspective view schematically showing a configuration of a television receiver according to a first embodiment of the present invention;

BEST MODE FOR CARRYING OUT THE INVENTION

First Embodiment

Figure 3:
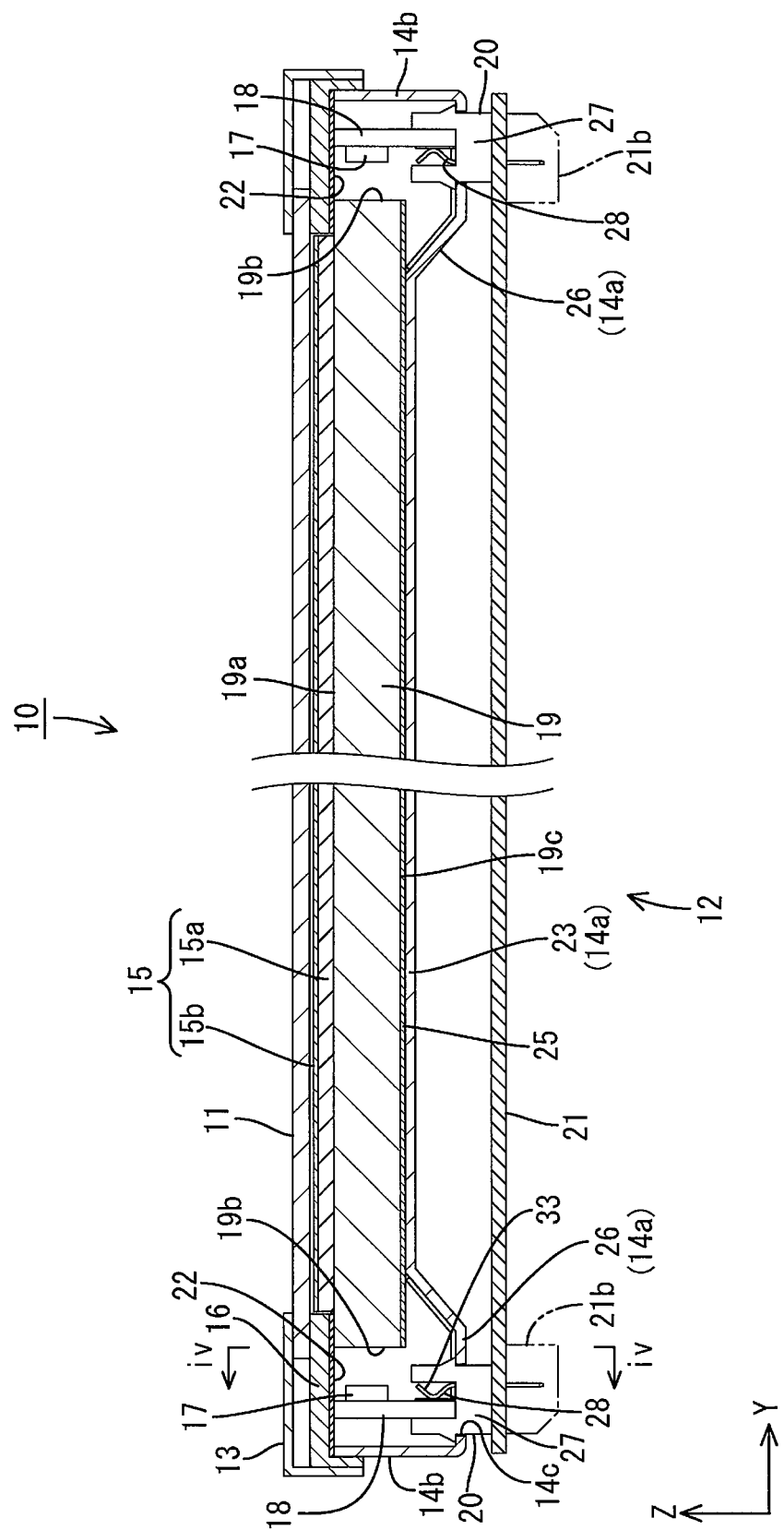
FIG. 3 is a cross sectional view showing a cross sectional configuration along a short-side direction of the liquid crystal display device.
Figure 4:
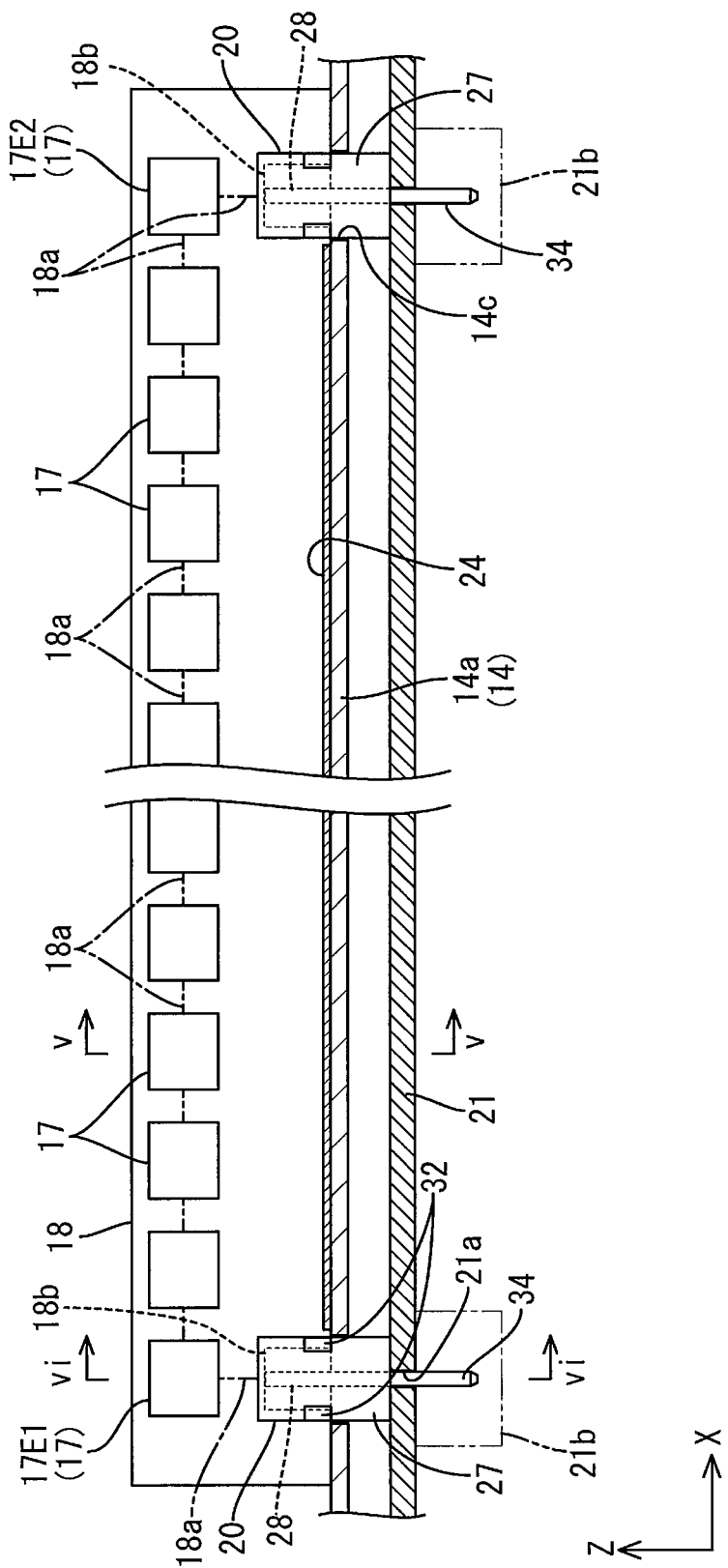
FIG. 4 is a cross sectional view along a line iv-iv in FIG. 3 and shows a cross sectional configuration of an LED board, a chassis, a connector and a power supply circuit board.

A description will be given of a first embodiment in accordance with the present invention with reference to FIGS. 1 to 9. In the present embodiment, a liquid crystal display device 10 is exemplified. In this case, an X-axis, a Y-axis and a Z-axis are shown in a part of each of the drawings, and each of the axial directions is drawn so as to be a direction shown by each of the drawings. Further, an upper side shown in FIGS. 3 and 4 is set to a front side, and a lower side in the same drawings is set to a back side.

As shown in FIG. 1, a television receiver TV in accordance with the present embodiment is structured so as to be provided with a liquid crystal display device 10, both front and back cabinets Ca and Cb which accommodate the liquid crystal display device 10 in a sandwiching manner, a power source P, a tuner T, and a stand S. The liquid crystal display device (the display device) 10 is formed in a horizontally-long (elongated) square shape (a rectangular shape) as a whole, and is accommodated in a vertically placed state. The liquid crystal display device 10 is provided with a liquid crystal panel 11 corresponding to a display panel, and a backlight unit (a lighting device) 12 corresponding to an external light source, as shown in FIG. 2, and is structured such that they are integrally retained by a frame-like bezel 13 or the like.

Figure 2:
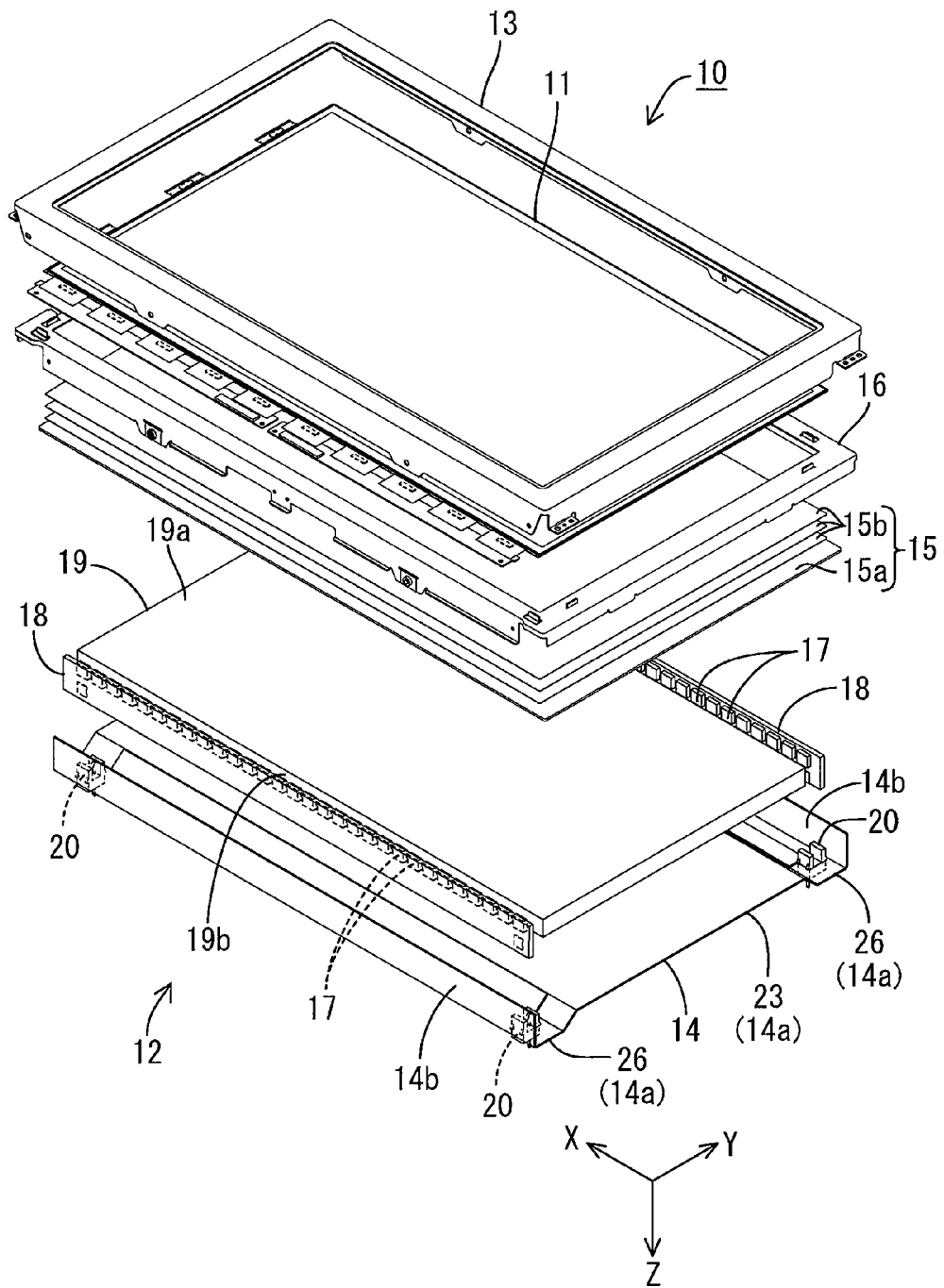
FIG. 2 is an exploded perspective view schematically showing a configuration of a liquid crystal display device included in the television receiver.

The liquid crystal panel 11 is formed in a horizontally-long (elongated) square shape (a rectangular shape) in a plan view, as shown in FIG. 2, and is structured such that a pair of glass substrates is laminated in a state of being spaced at a predetermined gap, and a liquid crystal is sealed between both the glass substrates. One of the glass substrates is provided with a switching component (for example, TFT) which is connected to a source wiring and a gate wiring which are orthogonal to each other, a pixel electrode which is connected to the switching component, an alignment film and the like. The other glass substrate is provided with a color filter or an opposed electrode in which respective color sections of a red color (R), a green color (G), a blue color (B) and the like are arranged in accordance with a predetermined array, the alignment film and the like. In this case, a polarizing plate is arranged in an outer side of both the substrates.

The backlight unit 12 is provided with a chassis 14 which has an opening portion open toward a light output surface side (a liquid crystal panel 11 side) and is formed in a substantially box-like shape, and a group of optical members 15 (a diffuser plate (a light diffusing member) 15*a*, and a plurality of optical sheets 15*b* arranged between the diffuser plate 15*a* and the liquid crystal panel 11) which are arranged so as to cover the opening portion of the chassis 14, as shown in FIG. 2. Further, within the chassis 14, there are provided an LED 17 (Light Emitting Diode) serving as a light source, an LED board 18 on which the LED 17 is mounted, a light guide member 19 which guides the light from the LED 17 so as to guide to the optical member 15 (the liquid crystal panel 11), and a frame 16 which presses the light guide member 19 from a front side. Further, the backlight unit 12 is structured as a so-called edge light type (a side light type) in which the LED board 18 having the LED 17 is provided in each of both end portions in a long side thereof, and the light guide member 19 is arranged in the center side which is located between both the LED boards 18. Further, the backlight unit 12 is provided with a connector 20 for electrically relay connecting to a power supply circuit board 21 in an external device as well as mechanically holding the LED board 18. A detailed description will be given below of each of the constituent parts of the backlight unit 12.

The chassis 14 is made of a metal, and is constructed, as shown in FIGS. 2 and 3, by a bottom plate 14*a* which is formed in a horizontally-long square shape in the same manner as the liquid crystal panel 11, and a pair of side plates 14*b* respectively rising up from both outer ends close to a long side in the bottom plate 14*a*. A long-side direction of the chassis 14 (the bottom plate 14*a*) coincides with an X-axis direction (a horizontal direction), and a short-side direction coincides with a Y-axis direction (a vertical direction). Further, a pressing member 16 and a bezel 13 can be screwed to the side plate 14*b*. A detailed description will be given later of a shape of the bottom plate 14*a* and the like.

The optical member 15 is formed in a horizontally-long square shape in a plan view in the same manner as the liquid crystal panel 11 and the chassis 14, as shown in FIG. 2. The optical member 15 is mounted on a front side (a light output side) of the light guide member 19, and is arranged so as to be interposed between the liquid crystal panel 11 and the light guide member 19. The optical member 15 is constructed by a diffuser plate 15*a* which is arranged in a back side (a side of the light guide member 19, a side opposite to the light output side), and an optical sheet 15*b* which is arranged in a front side (a side of the liquid crystal panel 11, the light output side). The diffuser plate 15*a* is structured such that a lot of diffusing particles are provided by being diffused into a base substrate which has a predetermined thickness, is made of an approximately transparent resin and is formed in a tabular shape, and has a function of diffusing the transmitting light. The optical sheet 15*b* is formed in a sheet shape thinner than the diffuser plate 15*a*, and three sheets are laminated and arranged. Examples of a specific kind of the optical sheet 15*b* include a diffuser sheet, a lens sheet, a reflection type polarizing sheet and the like, and it is possible to appropriately select and use among them.

The frame 16 is formed, as shown in FIG. 2, in a frame shape (a picture frame shape) which extends along an outer peripheral end portion of the light guide member 19, and can press an outer peripheral end portion of the light guide member 19 from a front side over an approximately entire periphery. The frame 16 is made of a synthetic resin, and its surface is, for example, black colored, thereby having a light blocking property. A first reflection sheet 22 reflecting the light is attached to each of the back side surfaces in both the long side portions in the frame 16, that is, a surface opposite to the light guide member 19 and the LED board 18 (the LED 17), as shown in FIG. 3. The first reflection sheet 22 has a magnitude which extends over an approximately entire length in the long side portion of the frame 16, and is structured so as to be directly brought into contact with an end portion close to the LED 17 in the light guide member 19 and collectively cover the end portion of the light guide member 19 and the LED board 18 from the front side. Further, the frame 16 can receive an outer peripheral end portion in the liquid crystal panel 11 from a back side.

Figure 5:
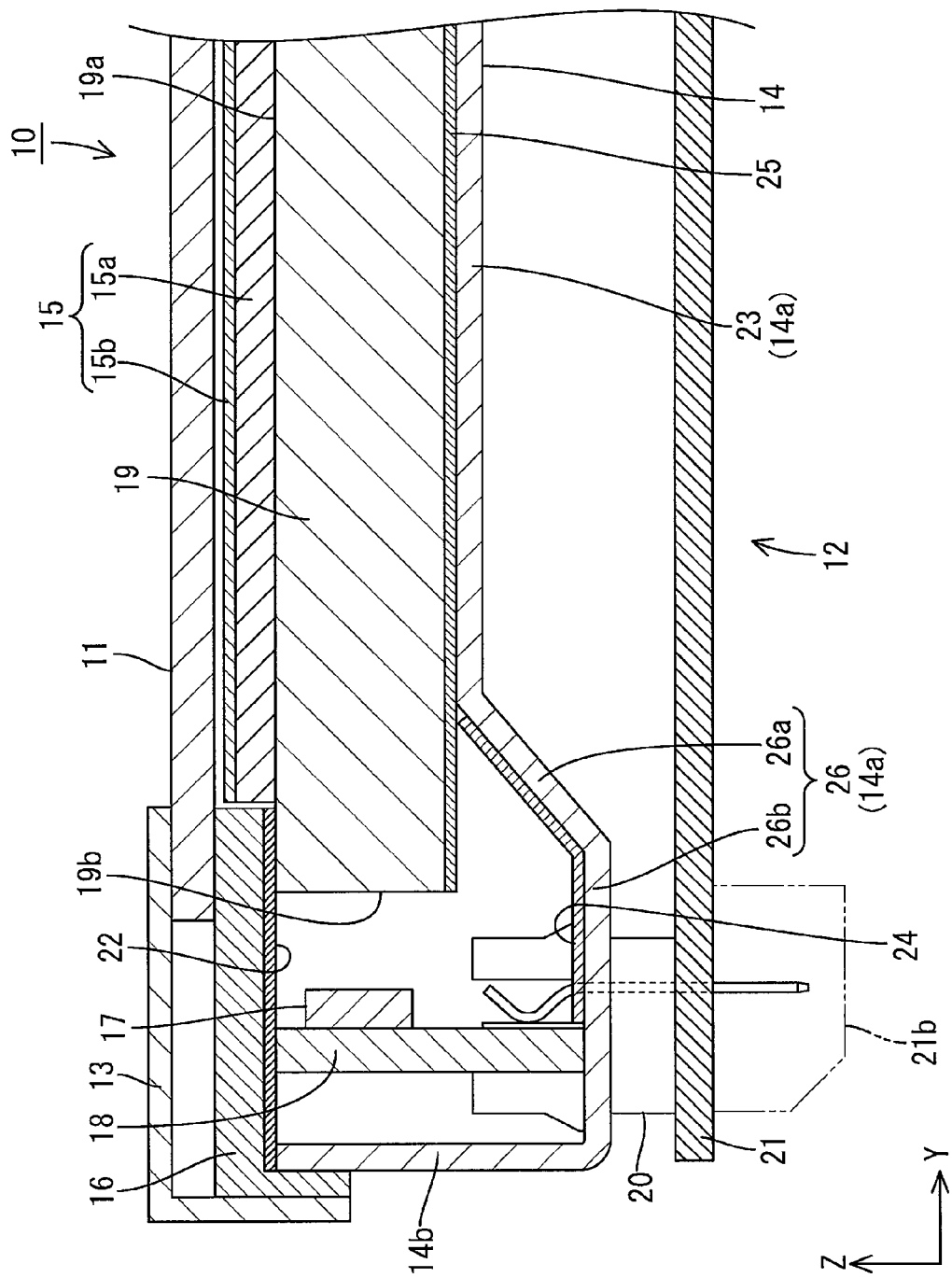
FIG. 5 is a cross sectional view along a line v-v in FIG. 4.

The LED 17 is structured, as shown in FIGS. 2, 3 and 5, such that an LED chip is sealed on a substrate portion which is firmly fixed to the LED board 18 by a resin material. The LED chip mounted to the substrate portion employs a structure having one kind of main light emitting wavelength and emitting a single blue light. On the other hand, a fluorescent material which is excited by the blue light emitted from the LED chip and emits a predetermined colored light is dispersion-blended in the resin material which seals the LED chip, and a white light is emitted in general as a whole. In this case, the fluorescent material can be used, for example, by appropriately combining a yellow fluorescent material which emits a yellow light, a green fluorescent material which emits a green light, and a red fluorescent material which emits a red light, or can be used as a single by employing any one of them. The LED 17 is structured, as a so-called top type that a surface opposite to a mounting surface on the LED board 18 serves as a light emitting surface.

The LED board 18 is made of a synthetic resin (an epoxy resin or the like) or a ceramic, is formed in an extended tabular shape which extends along a long-side direction of the chassis 14 (an end portion close to the LED 17 in the light guide member 19), as shown in FIGS. 2 to 4, and is accommodated in the chassis 14 in an attitude that a main plate surface thereof is parallel to the X-axis direction and the Z-axis direction, that is, an attitude that is orthogonal to a plate surface of the liquid crystal panel 11 and the light guide member 19 (the optical member 15). In other words, the LED board 18 is set to an attitude that the long-side direction in the main plate surface coincides with the X-axis direction, and the short-side direction coincides with the Z-axis direction, respectively, and a thickness direction orthogonal to the main plate surface coincides with the Y-axis direction. A pair of LED boards 18 is arranged at positions which hold the light guide member 19 therebetween in the Y-axis direction, as shown in FIGS. 2 and 3. More particularly, a pair of LED board 18 is arranged respectively so as to interpose between the light guide member 19 and each of the side plates 14*b* in the chassis 14, and is structured so as to be accommodated in the chassis 14 from the front side along the Z-axis direction. The LED 17 having the structure mentioned above is surface-mounted onto an inside surface in the main plate surface of the LED board 18, that is, a surface facing the light guide member 19 side (a surface opposite to the light guide member 19). Since a pair of LED boards 18 is accommodated within the chassis 14 in an attitude that the mounting surfaces of the LED 17 are located opposite to each other, the light emitting surfaces of the respective LEDs 17 which are respectively mounted to both the LED boards 18 are located opposite to each other, and the light axes in the respective LEDs 17 approximately coincide with the Y-axis direction. In other words, the respective LEDs 17 mounted to a pair of LED boards 18 are respectively arranged opposite to both the end portions in the light guide member 19. In this case, a raw material used in the LED board 18 may be set to a metal material, for example, the same aluminum material as the chassis 14, and may be structured such that a wiring pattern is formed on a surface thereof via an insulating layer.

A plurality of (thirty in FIG. 2) LEDs 17 are arranged parallel to each other in a liner (linearly) along the long-side direction (the X-axis direction) on the mounting surface of the LED board 18, as shown in FIGS. 2 and 4. In the LED board 18, this group of LEDs 17 is arranged eccentrically so as to be close to one end in the short-side direction (close to a side opposite to a terminal 18b to be mentioned later), specifically close to an end portion in the frame 16 side (the side of the liquid crystal panel 11, the front side). In the LED board 18, as shown in FIG. 4, there is formed a wiring pattern 18a which transverses the mounted group of LEDs 17, connects in series the LEDs 17 adjacent to each other, and is constructed by a metal film (a copper foil or the like). In detail, the wiring pattern 18a is structured so as to linearly transverse between an LED 17E1 which is positioned at one end in the long-side direction in the LED board 18, and an LED 17E2 which is positioned at the other end, along the long-side direction, and electrically connects all the mounted LEDs 17 to each other. Further, a pair of terminals (lands) 18b respectively connected to a connector 20 is formed in the vicinity of both end portions in the long-side direction, in the LED board 18. Subsequently, a description will be given in detail of the terminal 18b. In the following description, in the case of distinguishing the LED 17, a suffix "E1" is attached to reference numeral of the LED which is positioned in a left end shown in FIG. 4, and a suffix "E2" is attached to reference numeral of the LED which is positioned in a right end in the same drawing, respectively. In the case of generically naming without distinguishing, the suffix is not attached. Further, in FIGS. 4 and 7, the wiring pattern 18a is illustrated by a single-dot chain line, and the terminal 18b is illustrated in a hatched manner in FIG. 7.

Figure 7:
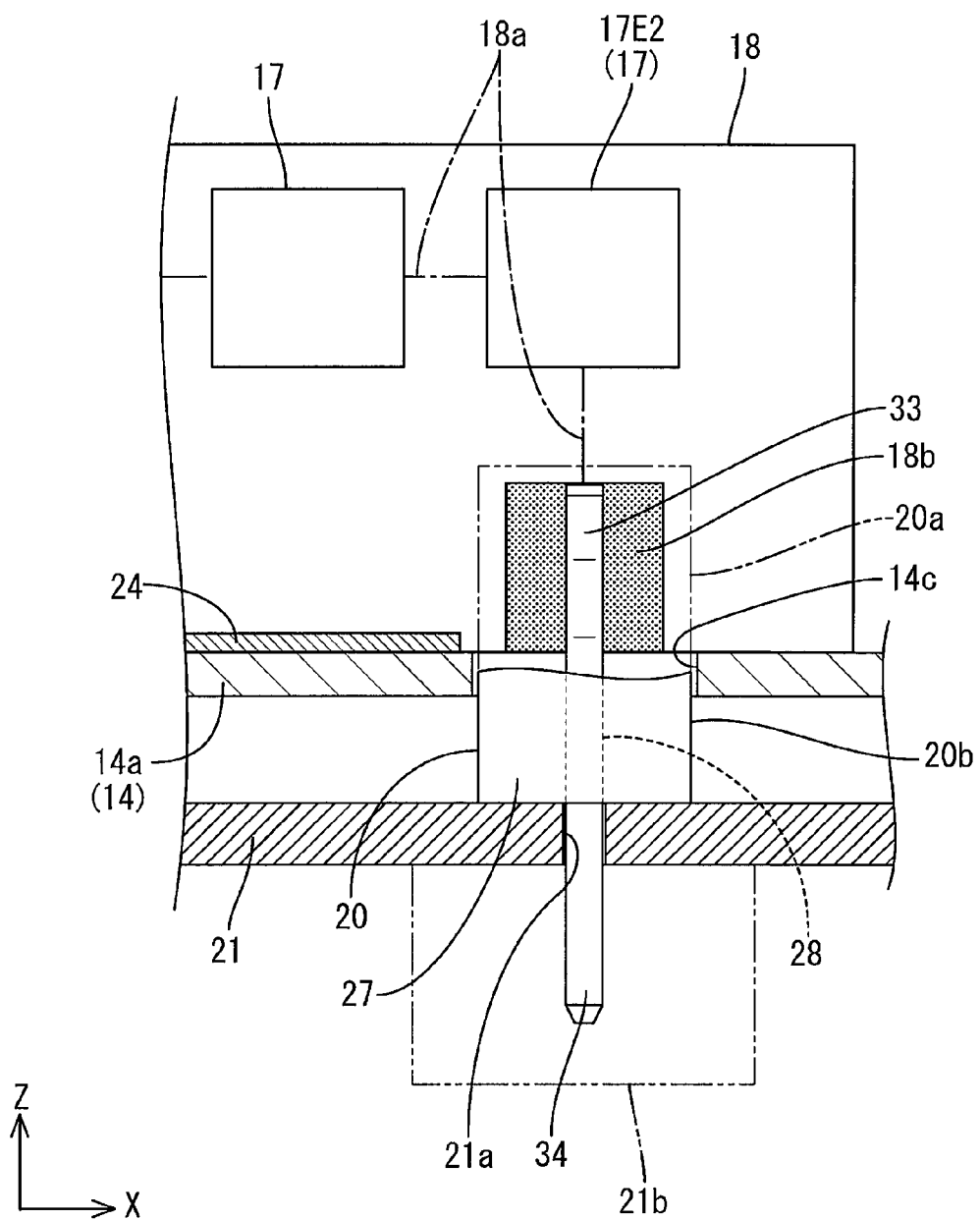
FIG. 7 is a partly notched cross sectional view showing a relationship between a connection terminal and a terminal.

The terminal 18b is constructed by the metal film in the same manner as the wiring pattern 18a, is formed in a square shape (a quadrangular shape) in a front view, and has a predetermined area (an area which is slightly smaller than the LED 17) in a surface of the main plate surface of the LED board 18, as shown in FIGS. 4 and 7. The terminal 18b is arranged at a position displaced from the LED 17 in the Z-axis direction with respect to the LED 17, that is, the short-side direction of the LED board 18 (a spaced position). In detail, the terminals 18b are respectively arranged at the positions which are parallel in the Z-axis direction while being spaced at a predetermined distance with respect to each of the LEDs 17E1 and 17E2 which are positioned at both ends in the long-side direction in the LED board 18. The respective terminals 18b are electrically connected to the respective LEDs 17E1 and 17E2 which are positioned at both ends in the long-side direction in the LED board 18 by the wiring pattern 18a. A portion connecting the terminal 18b and the LEDs 17E1 and 17E2 in the wiring pattern 18a is formed in a linear shape along the Z-axis direction, and a length thereof coincides with a distance between the terminal 18b and the LEDs 17E1 and 17E2. The terminal 18b is arranged eccentrically so as to be close to the other end in the short-side direction (the Z-axis direction) (close to a side opposite to the LED 17 side), in the LED board 18, and is particularly arranged in an end portion close to the bottom plate 14a of the chassis 14 (the connector 20 side, the back side), in the LED board 18. In this case, the wiring pattern 18a and the terminal 18b are both formed on the mounting surface of the LED 17 in the LED board 18. Therefore, the LED board 18 in accordance with the present embodiment is of a single-sided type that only one surface of the main plate surface is set to the mounting surface.

The light guide member 19 is made of a synthetic resin material (for example, an acrylic or the like) which has a sufficiently higher refraction factor than air and is approximately transparent (excellent in light transmission). The light guide member 19 is formed in a tabular shape which is a horizontally-long square shape in a plan view in the same manner as the liquid crystal panel 11 and the chassis 14, as shown in FIG. 2, a long-side direction in the main plate surface coincides with the X-axis direction, and a short-side direction coincides with the Y-axis direction, respectively, and a thickness direction orthogonal to the main plate surface coincides with the Z-axis direction. The light guide member 19 is arranged at a position which is just below the liquid crystal panel 11 and the optical member 15 within the chassis 14, as shown in FIG. 3, and is arranged so as to be sandwiched between a pair of LED boards 18 arranged in both end portions in the side of the long side in the chassis 14 with regard to the Y-axis direction. Therefore, the arranging direction of the LED 17 (the LED board 18) and the light guide member 19 coincides with the Y-axis direction, and the arranging direction of the optical member 15 (the liquid crystal panel 11) and the light guide member 19 coincides with the Z-axis direction, whereby both the arranging directions are orthogonal to each other. Further, the light guide member 19 has a function of introducing the light which is emitted from the LED 17 toward the Y-axis direction, and raising and outputting the light so as to head for the optical member 15 side (the Z-axis direction) while propagating in the inner portion. Since the light guide member 19 is arranged at the center position in the short-side direction in the bottom plate 14a of the chassis 14, the center portion in the short-side direction in the bottom plate 14a is set to a light guide member support portion 23 which supports the light guide member 19 from a back side. In this case, the size of the light guide member 19 is set to be larger than that of the optical member 15 mentioned above, and is structured such that an outer peripheral end portion thereof protrudes to an outer side than an outer peripheral end surface of the optical member 15 and is pressed by the flame 16 mentioned above (FIG. 3).

The surface facing the front side in the main plate surface of the light guide member 19 comes to a light output surface 19a which outputs the light in the inner portion toward the optical member 15 and the liquid crystal panel 11, as shown in FIG. 3. Both end surfaces close to the long side forming the elongated shape along the X-axis direction in the adjacent outer peripheral end surfaces with respect to the main plate surface in the light guide member 19 are respectively formed so as to be located opposite to each other while being spaced at a predetermined distance from the LED 17 (the LED board 18), and they come to a light incident surface 19b to which the light emitted from the LED 17 is input. The first reflection sheet 22 mentioned above is arranged in a front side of the space which is kept between the LED 17 and the light incident surface 19b, as shown in FIG. 5, and a second reflection sheet 24 is arranged in a back side of the space, so as to sandwich the space with respect to the first reflection sheet 22. Both the reflection sheets 22 and 24 are arranged so as to sandwich the end portion close to the LED 17 in the light guide member 19 and the LED 17, in addition to the space mentioned above. In accordance with this, it is possible to efficiently input to the light incident surface 19b by repeatedly reflecting the light from the LED 17 between both the reflection sheets 22 and 24. Further, the light incident surface 19b is set to a surface which is parallel along the X-axis direction and the Z-axis direction (the main plate surface of the LED board 18), and is set to a surface which is approximately orthogonal to the light output surface 19a. Further, the arranging direction of the LED 17 and the light incident surface 19b coincides with the Y-axis direction, and is parallel to the light output surface 19a.

A surface 19c in a side opposite to the light output surface 19a in the light guide member 19 is provided with a light guide reflection sheet 25 which can reflect and raise the light within the light guide member 19 to the front side so as to cover an entire region. In this case, a reflection portion (not illustrated) reflecting the light in the inner portion or a scatter portion (not illustrated) scattering the light in the inner portion is patterned at least in any one of the light output surface 19a and the surface 19c in the side opposite thereto in the light guide member 19 so as to have a predetermined in-plane distribution, whereby the light output from the light output surface 19a is controlled so as to have a uniform distribution within the surface.

Subsequently, a description will be given in detail of the connector 20. A pair of connectors 20 is arranged in the vicinity of both end portions in the long-side direction in the chassis 14, in correspondence to a pair of terminals 18b arranged in the vicinity of both end portions in the long-side direction in each of the LED boards 18, as shown in FIGS. 2 and 4. The connector 20 is passed through the bottom plate 14a and fitted into a mounting hole 14c which is formed in the bottom plate 14a of the chassis 14, as shown in FIG. 3. In the connector 20, a portion protruding into the chassis 14 is formed as an LED board side connection portion 20a which can be connected to the LED board 18, and a portion protruding outside the chassis 14 is formed as a power supply circuit board side connection portion 20b which can be connected to an external power supply circuit board 21. Among them, a protruding distal portion into the chassis 14 in the LED board side connecting portion 20a is arranged at a position which is lower than the light guide member 19, that is, a position which is deflected from the light guide member 19 in the Z-axis direction (the short-side direction of the LED board 18), thereby avoiding a matter that an interference with the light guide member 19 is generated. Since a pair of connectors 20 is arranged in the vicinity of each of both end positions in the short-side direction in the bottom plate 14a of the chassis 14, both end portions in the short-side direction except the light guide member support portion 23 in the bottom plate 14a are set to be a connector mount portion 26 in which the connector 20 is mounted. The connector mount portion 26 includes a rising portion 26a which rises from the light guide member support portion 23 toward a back side and is formed in an inclined shape, and an outer end portion 26b which protrudes outward along the Y-axis direction from a rising end of the rising portion 26a. The outer end portion 26b has a mounting hole 14c, is parallel to the light guide member support portion 23, and is structured such that the side plate 14b rises from an outer end thereof. A pair of mounting holes 14c is formed in the vicinity of both the end portions in the X-axis direction in the outer end portion 26b (FIG. 4). Further, the second reflection sheet 24 mentioned above is arranged along an inner surface of the connector mount portion 26, and is arranged in a range which overstrides the rising portion 26a and the outer end portion 26b (FIG. 5).

Figure 6:
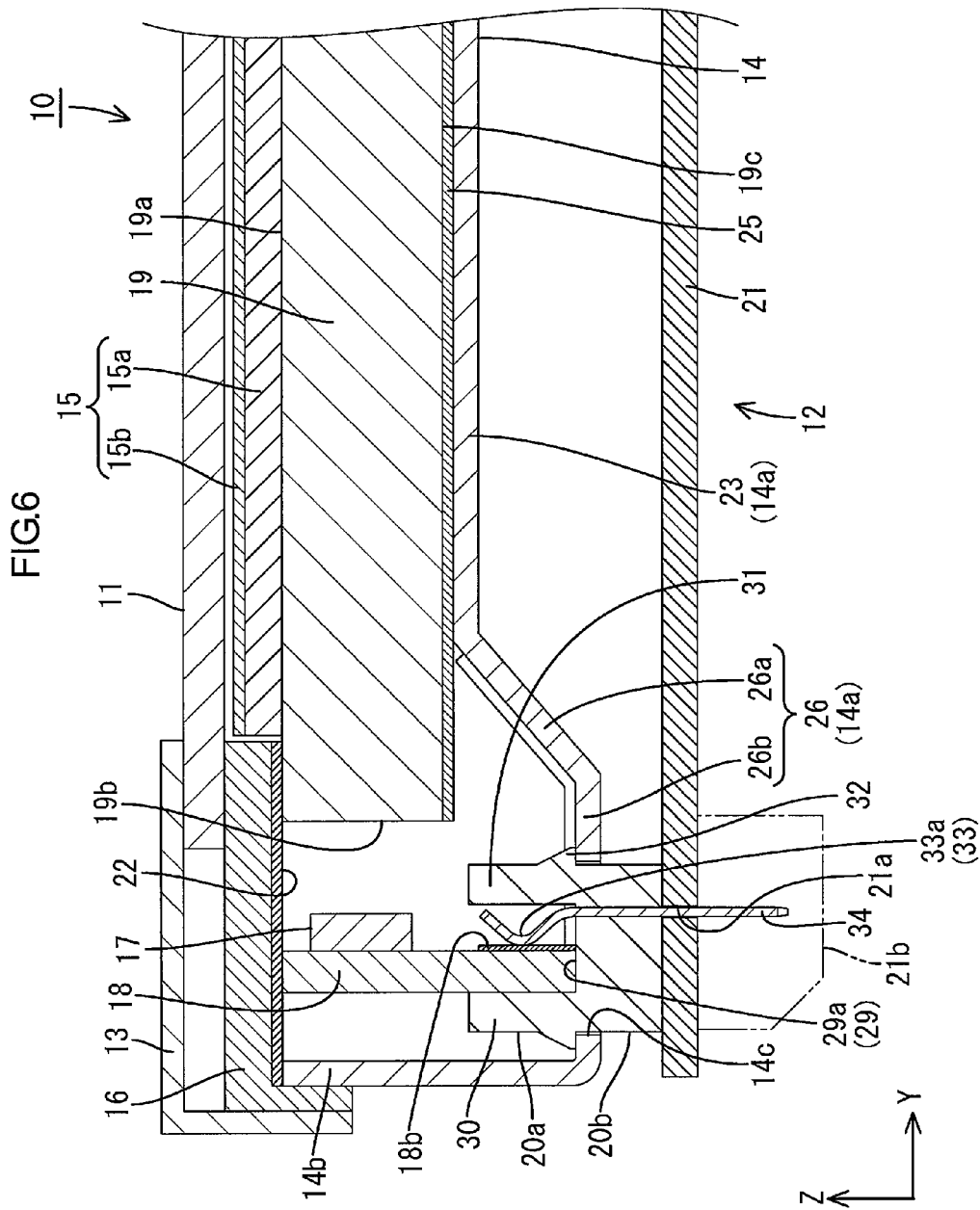
FIG. 6 is a cross sectional view along a line vi-vi in FIG. 4.

The connector 20 is constructed, as shown in FIG. 6, by a connector housing 27, and a connection terminal 28 which is inserted (embedded) within the connector housing 27. The connector housing 27 is made of a synthetic resin having an insulating property, and is formed in an approximately block shape as a whole. A pair of walls 30 and 31 arranged opposite to each other such that an insertion groove 29 is provided between the walls for receiving the LED board 18 in a portion protruding into the chassis 14, that is, a portion constructing the LED board side connecting portion 20a, in the connector housing 27. The insertion groove 29 has an opening extending along the Z-axis direction (the short-side direction of the LED board 18) and be open to both sides along the X-axis direction (the long-side direction of the LED board 18). Accordingly, the LED board 18 can be inserted into the insertion groove 29 along the short-side direction (the Z-axis direction) from the front side, and both end portions in the long-side direction (the X-axis direction) in the LED board 18 are exposed to an outer side of the connector 20 in an inserted state and can relatively displace with respect to the connector 20 along the long-side direction (the X-axis direction). Further, a receiving surface 29a receiving the inserted LED board 18 is formed in a far end of the insertion groove 29, whereby it is possible to regulate the insertion depth of the LED board 18. Therefore, it is possible to keep a positional relationship between the LED board 18 and the connector 20 in the Z-axis direction at a constant level.

A pair of walls 30 and 31 is arranged so as to sandwich the LED board 18 inserted to the insertion groove 29 from front and back sides in the Y-axis direction, and is constructed by an outer wall portion 30 which is arranged in an outer side (the side of the side plate 14b) in the short-side direction in the chassis 14, with respect to the LED board 18, and an inner wall portion 31 which is arranged in an inner side of the short-side direction (the side of the light guide member 19). Among them, the outer wall portion 30 comes into contact with a surface in a side opposite to the mounting surface of the LED 17 and the terminal 18b in the main plate surface of the LED board 18 and can be supported. On the other hand, the inner wall portion 31 is arranged so as to be opposed at a position which is spaced at a predetermined distance with respect to the mounting surface of the LED 17 and the terminal 18b in the main plate surface of the LED board 18. The LED board 18 inserted into the insertion groove 29 is held between both the walls 30 and 31 at the other end portion of the short side of the LED board 18 that is, an end portion in which the terminal 18b is arranged. Further, on each of outer surfaces of both the walls 30 and 31, there are formed a pair of retention projections 32 which can retain the connector 20 such that the connecter 20 will not be removed from the chassis 14 by being engaged with an edge portion of the mounting hole 14c of the chassis 14.

The connection terminal 28 is made of a metal which is excellent in an electric conductivity, and is embedded so as to pass through the connector housing 27 along the Z-axis direction, as shown in FIGS. 6 and 7. Among the connection terminal 28, one end side which is arranged within the chassis 14 is formed as an elastic contact part 33 which constructs the LED board side connection portion 20a, and the other end side which is arranged outside the chassis 14 is formed as a tab portion 34 which constructs the power supply circuit board side connection portion 20b. Among them, the tab portion 34 is structured so as to protrude from the connector housing 27 further toward the back side, and be inserted to the insertion hole 21a which is formed in the power supply circuit board 21. The power source side connector 21b is mounted in the power supply circuit board 21, and the tab portion 34 is electrically connected to the power source side connector 21b. In this case, in FIGS. 3 to 7, the power source side connector 21b is shown by a two-dot chain line.

Figure 9:
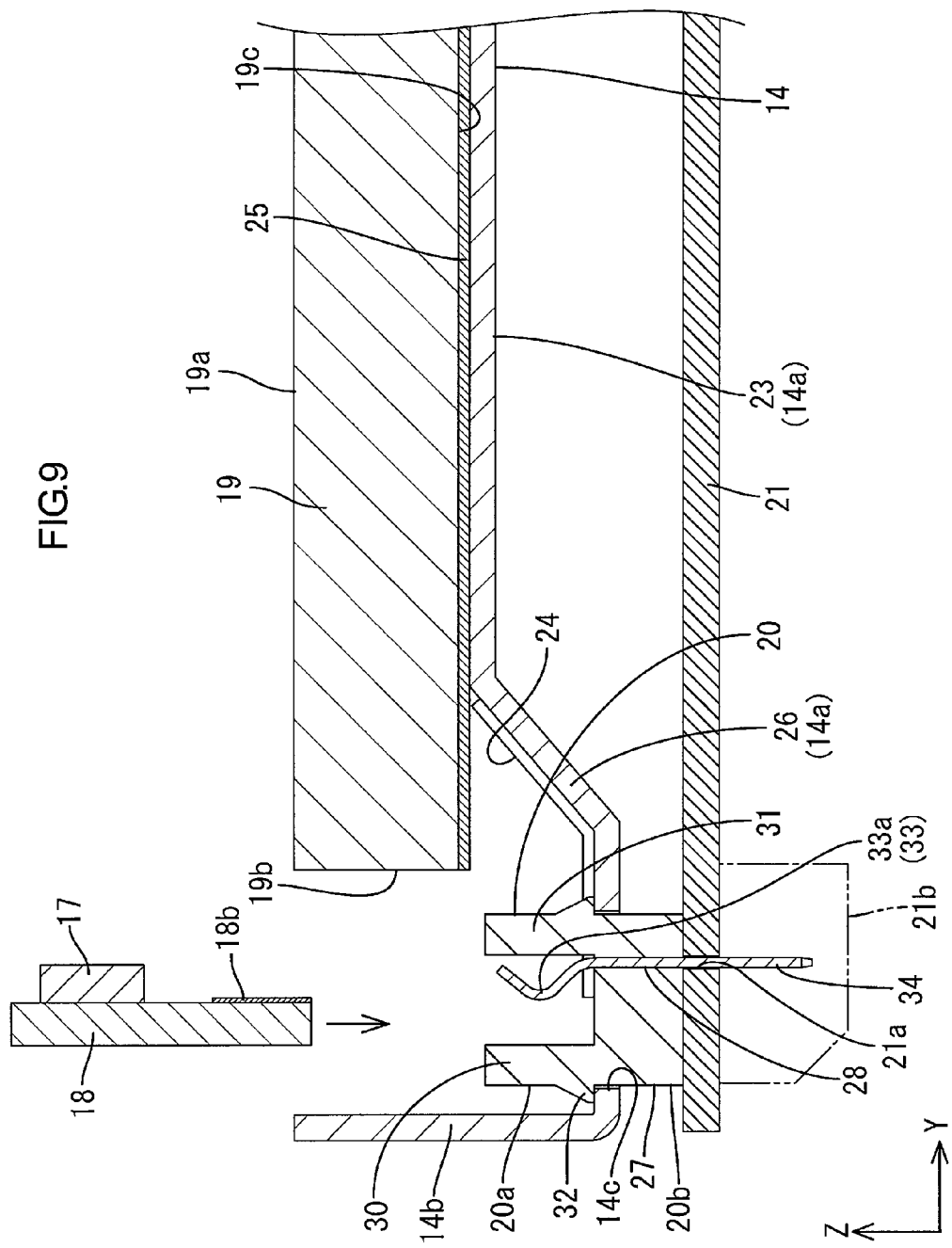
FIG. 9 is a cross sectional view along a line ix-ix in FIG. 4.

The elastic contact part 33 is arranged so as to be exposed to the insertion groove 29 by protruding from the side of the inner wall portion 31 in the connector housing 27 toward the side of the outer wall portion 30, that is, the side of the inserted LED board 18, and a cross sectional shape is formed as an approximately V-shaped form. The elastic contact part 33 can be elastically deformed around the protruding proximal portion from the connector housing 27 as a supporting point. A protruding leading end portion to the LED board 18 side is set to a contact point 33a with respect to the terminal 18b, in the elastic contact part 33. This contact point 33a is arranged at a position at which the distance retained with respect to the outer wall portion 30 becomes a little smaller than the thickness of the LED board 18 in a state before the LED board 18 is inserted (FIG. 9). Therefore, if the LED board 18 is inserted into the insertion groove 29, the elastic contact part 33 is structured so as to be elastically deformed while being open in accordance with a contact of the contact point 33a with the terminal 18b. In accordance with this, it is possible to mechanically hold the LED board 18 with respect to the outer wall portion 30 on the basis of a snapping force applied from the elastic contact part 33, and it is possible to keep the elastic contact part 33 in a contact state by a predetermined contact pressure with respect to the terminal 18b.

As mentioned above, the elastic contact part 33 of the connection terminal 28 is structured such that an electrical connection state is maintained by being elastically in contact with the terminal 18b of the LED board 18. Since the elastic contact part 33 and the terminal 18b are not fixed by a soldering or the like, the elastic contact part 33 is slidable along the surface of the terminal 18b relative to the terminal 18 while maintaining the contact state with each other. Therefore, for example, even in the case that the LED board 18 expands or contracts in the long-side direction (the X-axis direction) in connection with the thermal expansion or the thermal contraction, the terminal 18b is slidable along the X-axis direction of the LED board 18 relative to elastic contact part 33 while maintaining the contact state. In accordance with this, it is possible to allow the expansion or contraction of the LED board 18 in connection with the thermal expansion or the thermal contraction without causing a loose connection.

Further, in the present embodiment, the terminal 18b is structured, as shown in FIG. 7, such that a dimension in the X-axis direction is relatively larger than the elastic contact part 33 (the connection terminal 28). In other words, the terminal 18b is formed wider than the elastic contact part 33 (the connection terminal 28) with respect to the long-side direction of the LED board 18. In a state in which the LED board 18 is fitted while being regularly positioned in the X-axis direction with respect to the connector 20, the elastic contact part 33 is brought into contact approximately at the center position in the X-axis direction in the terminal 18b, and a margin portion of the terminal 18b is secured at a predetermined width in each of both sides of the elastic contact part 33. Therefore, even in the case that the LED board 18 expands or contracts with respect to the long-side direction in connection with the thermal expansion or the thermal contraction, and the terminal 18b is slidable along the X-axis direction of the LED board 18 relative to the elastic contact part 33, the elastic contact part 33 is structured such that the contact state is maintained by being brought into contact with the margin portion of the terminal 18b mentioned above. In this case, a dimension in the X-axis direction in the terminal 18b is set to a magnitude in expectation of a maximum value which can be assumed in an amount of expansion or contraction of the LED board 18 in connection with the thermal expansion or the thermal contraction.

The present embodiment is structured as mentioned above, and a description will be given subsequently of an operation thereof. In order to manufacture the liquid crystal display device 10, the liquid crystal panel 11, the backlight unit 12 and the bezel 13 are assembled, each of which is independently manufactured. A description will be given below of a manufacturing procedure of the liquid crystal display device 10.

Figure 8:
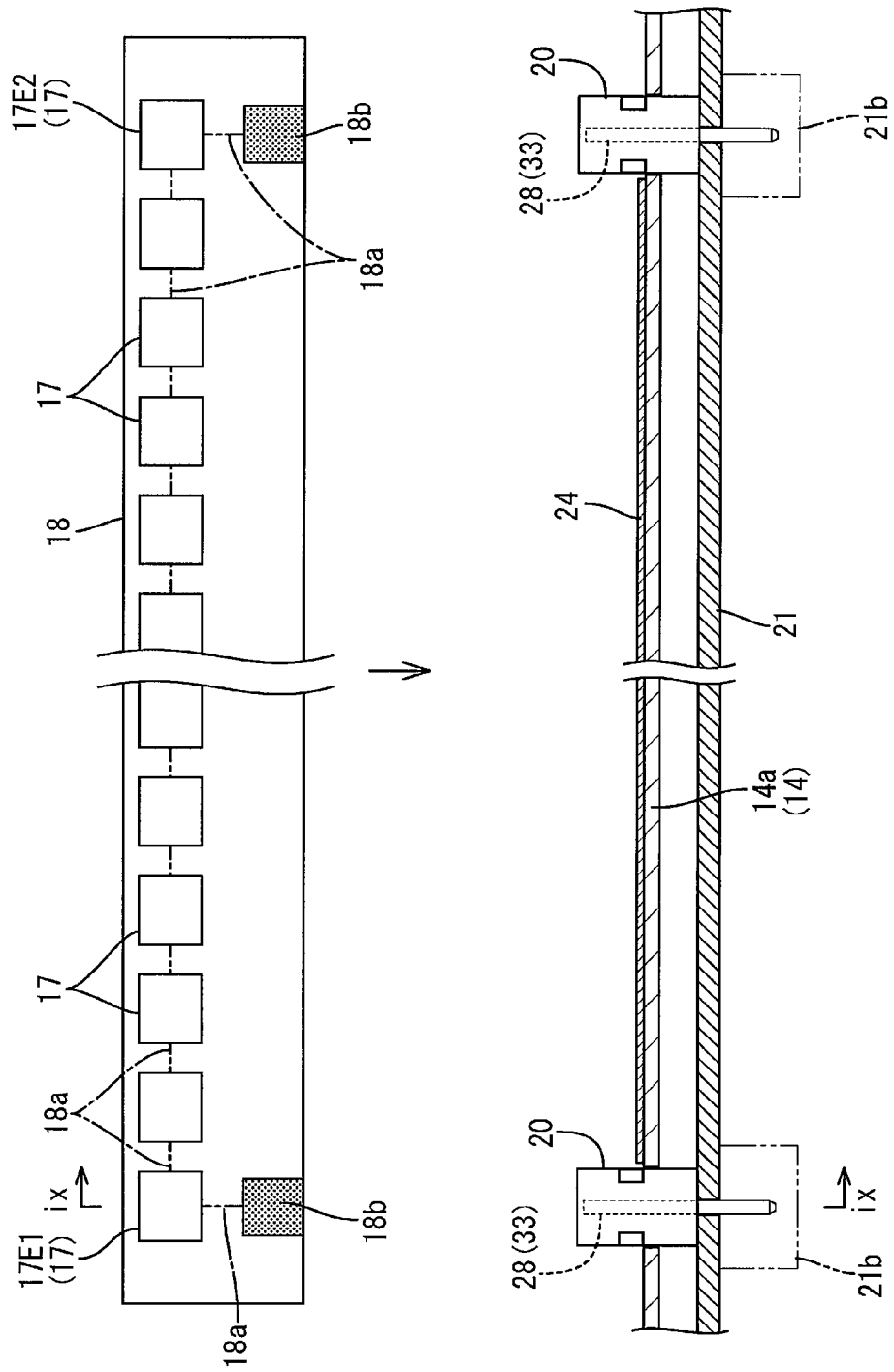
FIG. 8 is a cross sectional view along a line iv-iv in FIG. 3 and shows a state before the LED board is inserted into the connector.

First of all, there is carried out a work of assembling the connector 20, the second reflection sheet 24 and the light guide member 19 within the chassis 14. At a time of assembling the connector 20, the connector 20 is inserted into the mounting hole 14c in the connector mount portion 26 (the end portion in the short-side direction) in the bottom plate 14a of the chassis 14 from the back side. Accordingly, as shown in FIG. 8 and FIG. 9, since the retention projection 32 is engaged with the edge portion of the mounting hole 14c from the front side, the connector 20 is held so as to be prevented from removing in a state in which it passes inward and outward through the chassis 14. The second reflection sheet 24 is installed along the connector mount portion 26 in the bottom plate 14a, and is arranged between a pair of connectors 20 arranged in the X-axis direction (FIG. 8). The light guide member 19 is structured so as to be mounted to the light guide member support portion 23 (the center portion in the short-side direction) in the bottom plate 14a in a state in which the light guide reflection sheet 25 is attached to the surface 19c in the back side.

Subsequently, an assembling work of the LED board 18 is carried out. The LED board 18 is assembled between the side plate 14b of the chassis 14 and the light incident surface 19b of the light guide member 19 from the front side along the Z-axis direction (the short-side direction of the LED board 18). This work is carried out while positioning each of the terminals 18b which are arranged in both end sides in the long-side direction in the LED board 18 with regard to the X-axis direction with respect to each of the connectors 20. In the LED board 18, if the end portion in the back side in which the terminal 18b is arranged is inserted into the insertion groove 29 of the connector 20, the contact point portion 33a of the elastic contact part 33 which is exposed into the insertion groove 29 comes into contact with the terminal 18b. Accordingly, the elastic contact part 33 is elastically open deformed. Further, if the LED board 18 is inserted to a regular depth, it is brought into contact with the receiving surface 29a of the insertion groove 29 as shown in FIGS. 4 and 6, whereby a farther insertion is regulated. Therefore, the LED board 18 is positioned in the Z-axis direction with respect to the connector 20 and the light guide member 19. In this inserted state, the LED board 18 is held in a state of being sandwiched between the outer wall portion 30 in the connector 20 and the elastic contact part 33. At this time, since the elastic contact part 33 is elastically deformed, it applies a predetermined snapping force to the LED board 18, whereby the LED board 18 is elastically sandwiched with respect to the outer wall 30 and the elastic contact part 33, and is structured such that a mechanical retention is achieved, and the contact state can be stably maintained by a predetermined contact pressure with respect to the terminal 18b. In accordance with this, an electrical connection between the LED board 18 and the connector 20 is established. In this contact state, as shown in FIG. 7, the margin portion of the terminal 18b is secured at a predetermined width in each of both sides of the elastic contact parts 33.

Thereafter, the light guide member 19 is retained from the front side and each of the optical members 15 are mounted on the light guide member 19, by assembling the frame 16, and the liquid panel 11 and the bezel 13 are then assembled sequentially. On the other hand, the power supply circuit board 21 is fixed to the back surface side of the chassis 14 by screws or the like. At this time, the tab portion 34 of the connection terminal 28 in the connector 20 is inserted to the insertion hole 21a in the power supply circuit board 21. In accordance with this, the connector 20 is electrically connected to the power source side connector 21b of the power supply circuit board 21. In other words, the power supply circuit board 21 is electrically relay connected to each of the LEDs 17 in the LED board 18 via the connector 20.

If the power source of the liquid crystal display device 10 is turned on, the drive of the liquid crystal panel 11 is controlled by a control circuit which is not illustrated, and the driving power from the power supply circuit board 21 is supplied to each of the LEDs 17 of the LED board 18 via the connector 20, whereby the drive thereof is controlled. The light from each of the LEDs 17 is guided by the light guide member 19, thereby being irradiated to the liquid crystal panel 11. Accordingly, a predetermined image is displayed on the liquid crystal panel 11. A detailed description will be given below of an operation in accordance with the backlight unit 12. If each of the LED 17 is lighted, the light emitting from each of the LEDs 17 is incident to the light incident surface 19b in the light guide member 19 as shown in FIG. 5. In this case, a predetermined space is retained between the LED 17 and the light incident surface 19b; however, since the space is optically closed by the first reflection sheet 22 in the front side and the second reflection sheet 24 in the back side, the light from the LED 17 is repeatedly reflected by both the reflection sheets 22 and 24, thereby being efficiently input to the light incident surface 19b with almost no leakage to the outer portion.

In the use of the liquid crystal display device 10, when each of the LEDs 17 is lighted, a change is generated in a temperature environment within the backlight unit 12. The change of the temperature environment tends to be larger in accordance with increase in screen size of the liquid crystal display device 10 and also increase in the number of the LEDs 17 used. Further, in order to increase the number of the LED 17 to be installed, it is necessary to use the LED board 18 in which the dimension of the long side is larger, an amount of expansion or contraction becomes larger in the long-side direction in the case that the thermal expansion or the thermal contraction is generated in the LED board 18. In this case, if the LED board 18 is fixed to the connection terminal in accordance with a soldering as in a conventional case, there is a possibility that a crack is formed in the soldered portion due to the expansion or contraction of the LED board 18, and a loose connection is generated.

Accordingly, in the present embodiment, the connection terminal 28 of the connector 20 is structured so as to be in contact with the terminal 18b of the LED board 18 and slidable along the long-side direction of the LED board 18 relative to the terminal 18b of the LED board 18. Specifically, the terminal 18b is formed wider in the X-axis direction than the elastic contact part 33 of the connection terminal 28 as shown in FIG. 7, and retains a margin portion in both sides of the elastic contact part 33. Therefore, even in the case that the thermal expansion or the thermal contraction is generated in the LED board 18 from this state and it expands or contracts in the long-side direction (the X-axis direction), and the terminal 18b relatively slides along the X-axis direction of the LED board 18 relative to the elastic contact part 33 in connection with this, both the elements 18b and 33 are securely maintained in the contact state. In accordance with this, it is possible to avoid the loose connection generated between the LED board 18 and the connector 20, whereby it is possible to obtain a high connection reliability.

As described above, the backlight unit 12 in accordance with the present embodiment is provided with the elongated LED board 18 which has the LED 17 serving as the light source, the chassis 14 in which the LED board 18 is housed, the light guide member 19 in which the end portion is arranged opposite to the LED 17 of the LED board 18, and the connector 20 which is mounted to the chassis 14, holds the LED board 18 and establishes the electrical connection to the external device. The LED board 18 is provided with the terminal 18b which is electrically connected to the LED 17, and the connector 20 includes the connection terminal 28 is in contact with the terminal 18b of the LED board 18 and slidable along a long-side direction of the LED board 18 relative to the terminal 18b of the LED board 18.

As mentioned above, if the connector 20 mounted to the chassis 14 holds the LED board 18, electrical connection is established with the external device, and the LED 17 of the LED board 18 is kept in the state of being arranged so as to be opposed to the end portion of the light guide member 19. In the case that the LED board 18 expands or contracts in the long-side direction in connection with the thermal expansion or the thermal contraction, the stress is applied to the soldered portion and there is a risk that the crack is generated since the lead frame has been conventionally soldered to the LED board. In comparison with this, in accordance with the present embodiment, since the connection terminal 28 and the terminal 18b can be relatively slid in the long-side direction of the LED board 18 while maintaining the contact state with each other, it is possible to avoid the generation of the loose connection. Particularly, in the case that the backlight unit 12 is increased in size, the LED board 18 tends to be extended in the long-side direction, and accordingly the amount of expansion or contraction becomes larger in connection with the thermal expansion or the thermal contraction. Therefore, the present embodiment can be said to be preferable for the size increase. As mentioned above, in accordance with the present embodiment, it is possible to enhance a reliability of the electrical connection.

Further, the terminal 18b is formed relatively wider than the connection terminal 28 in the long-side direction of the LED board 18. In accordance with this, even in the case that the LED board 18 expands or contracts in the long-side direction in connection with the thermal expansion or the thermal contraction, whereby the terminal 18b slides along the long-side direction of the LED board 18 relative to the connection terminal 28, it is possible to well maintain the contact state of the connection terminal 28 since the terminal 18b is made relatively wider in the long-side direction. In this case, since the terminal 18b is made wider as mentioned above, but is formed in the LED board 18 formed in the elongated shape, it is possible to easily secure the installing space without enlarging the size of the LED board 18. On the contrary, since the connection terminal 28 close to the connector 20 can be made relatively narrower, it is possible to avoid the size increase of the connector 20.

Further, the connector 20 has a pair of walls 30 and 31 are arranged opposite to each other such that the insertion groove 29 is provided between the walls for receiving the LED board 18. In accordance with this, since the LED board 18 is sandwiched between a pair of walls 30 and 31 by inserting the LED board 18 into the insertion groove 29 of the connector 20, the retention is achieved.

Further, the connection terminal 28 is formed such that the contact position (the elastic contact part 33) with the terminal 18b protrudes toward the LED board 18 from the side of the inner wall portion 31 which is any one wall portion of a pair of walls 30 and 31. In accordance with this, in a state in which the contact position (the elastic contact part 33) of the connection terminal 28 protruding from the side of the inner wall portion 31 is being in contact with the terminal 18b, since the LED board 18 is received by the outer wall portion 30 which is the other wall portion arranged in the side opposite to the connection terminal 28, it is possible to obtain a good contact state.

Further, the insertion groove 29 has an opening extending along the short-side direction of the LED board 18. In accordance with this, it is possible to insert the LED board 18 to the connector 20 along the short-side direction.

Further, the receiving surface 29a receiving the LED board 18 is formed at the far end in the insertion groove 29. In accordance with this, since it is possible to regulate the insertion depth of the LED board 18 with respect to the connector 20, it is possible to position the LED board 18 in the inserting direction with respect to the connector 20. At this time, it is possible to position the LED 17 of the LED board 18 with respect to the end portion of the light guide member 19, whereby it is possible to well input the light from the LED 17 to the light guide member 19.

Further, the insertion groove 29 has an opening extending along the long-side direction of the LED board 18. In accordance with this, since the LED board 18 can be freely expanded and contracted in the long-side direction in the state of being inserted into the insertion groove 29, it is possible to avoid the stress generation and the deformation of the LED board 18 at a time when the thermal expansion or the thermal contraction is generated.

Further, on the LED board 18, a plurality of LEDs 17 is arranged parallel to each other in the long-side direction, and the wiring pattern 18a which connects a plurality of LEDs 17 in series is formed. In accordance with this, it is possible to drive in series a plurality of LEDs 17 collectively by connecting a plurality of LEDs 17 in series in accordance with the wiring pattern 18a.

Further, the terminal 18b is formed in each of one end portion side and the other end portion side in the long-side direction in the LED board 18, and a pair of connectors 20 is arranged at two positions which are spaced in the long-side direction in correspondence to a pair of terminals 18b. In accordance with this, it is possible to drive in series a plurality of LEDs 17 which are connected in series by the wiring pattern 18a by, for example, setting the connector 20 which is arranged in the one end portion side in the long-side direction in the LED board 18 to an input side, and setting the connector 20 which is arranged in the other end portion side to the output side. Since the terminal 18b and the connector 20 are respectively arranged in each of the end portion sides in the long-side direction in the LED board 18, it is possible to reduce a distance from the LED 17 which is positioned in the end in the long-side direction in the LED board 18 to the terminal 18b, whereby it is possible to avoid a vain elongation of the wiring pattern 18a.

Further, the terminal 18b is arranged at a position displaced from the LED 17 in the short-side direction of the LED board 18 with respect to the LED 17. In accordance with this, it is possible to downsize the LED board 18 in the long-side direction, in comparison with the case that the terminal and the LED are arranged so as to be displaced each other in the long-side direction of the LED board 18.

Further, the terminals 18b are arranged parallel to the LED 17 in the short-side direction. In accordance with this, since it is possible to reduce the distance between the LED 17 and the terminal 18b short in comparison with the case that the terminal is arranged at a position displaced from the LED 17 in the long-side direction, the wiring pattern 18a can be made short in the case that, for example, the LED 17 and the terminal 18b are connected in accordance with the wiring pattern 18a.

Further, in the LED board 18, a plurality of LEDs 17 are arranged parallel to each other in the long-side direction, and the wiring pattern 18a connecting in series a plurality of LEDs is formed, and the terminal 18b is arranged parallel in the short-side direction to the LEDs 17E1 and 17E2 which are positioned at the end in the long-side direction among a plurality of LEDs 17. In accordance with this, it is possible to reduce the distance of the wiring pattern 18a which is arranged from the LEDs 17E1 and 17E2 positioned at the end to the terminal 18b, in comparison with the case that the terminal is arranged closer to the center than the LEDs 17E1 and 17E2 which are positioned at the end in the long-side direction. Further, it is possible to downsize the LED board 18 in the long-side direction, in comparison with the case that the terminal is arranged much closer to the end than the LEDs 17E1 and 17E2 which are positioned at the end in the long-side direction.

Further, the LED 17 is arranged so as to be eccentric to the one end side in the short-side direction in the LED board 18, but the terminal 18b is arranged so as to be eccentric to the other end side in the short-side direction in the LED board 18. In accordance with this, it is possible to efficiently arrange the LED 17 and the terminal 18b which are arranged so as to be displaced each other in the short-side direction, in the LED board 18.

Further, the connector 20 is configured to retain the other end portion in the short-side direction in the LED board 18. In accordance with this, it is possible to keep the connector 20 compact in the short-side direction of the LED board 18.

Further, the chassis 14 has the bottom plate 14a which is arranged in the side opposite to the light output side with respect to the LED board 18 and the light guide member 19 and to which the connector 20 is mounted, the bottom plate 14a has the light guide member support portion 23 which supports the light guide member 19, and the connector mount portion 26 to which the connector 20 is mounted, and the connector mount portion 26 is structured so as to protrude to the outer side than the light guide member support portion 23. Since the LED board 18 is arranged such that the LED 17 and the terminal 18b are displaced each other in the short-side direction, it tends to be increased in size in the short-side direction. In this regard, in accordance with the present embodiment, since the connector mount portion 26 in the chassis 14 is structured so as to protrude to the outer side than the light guide member support portion 23, it is possible to sufficiently secure the installing space of the LED board 18 within the chassis 14.

Further, the connector 20 is arranged at the position displaced from the light guide member 19 in the short-side direction of the LED board 18. In accordance with this, it is possible to avoid the mutual interference between the light guide member 19 and the connector 20.

Further, the terminal 18b is formed on the same surface as the surface on which the LED 17 is arranged in the LED board 18. In accordance with this, since the terminal 18b and the LED 17 are formed on the same surface in the LED board 18, the LED board 18 can be formed as the single-sided type, and it is possible to reduce the manufacturing cost for the LED board 18.

Further, the connection terminal 28 has the elastic contact part 33 which is configured to come into the elastic contact with the terminal 18b. In accordance with this, it is possible to maintain the contact state with the good contact pressure by bringing the elastic contact part 33 into elastic contact with the terminal 18b.

Further, the chassis 14 has the mounting hole 14c through which the connector 20 is passed such that the connector 20 is fitted therein. In accordance with this, the LED board 18 within the chassis 14 can be electrically connected to the external device via the connector 20 which is passed through the chassis 14 and fitted in the mounting hole 14c.

Further, the connector 20 has the connector housing 27 which has the connection terminal 28 built-in and which also has an insulating property. In accordance with this, it is possible to keep the connection terminal 28 in an insulated state with respect to the chassis 14 by the connector housing 27.

Further, the connector housing 27 is made of the synthetic resin, and the connection terminal 28 is inserted into the connector housing 27. In accordance with this, it is possible to reduce a manufacturing cost for the connector 20.

Further, the LED 17 and the end portion of the light guide member 19 which is arranged opposite to the LED 17 are arranged so as to be spaced from each other while keeping a space, and a pair of reflection sheets 22 and 24 arranged so as to sandwich the space is provided. In accordance with this, the light emitted from the LED 17 is repeatedly reflected by a pair of reflection sheets 22 and 24 in the space which is kept between the end portions of the opposed light guide members 19, thereby being efficiently input to the end portion of the light guide member 19. In accordance with this, it is possible to improve an efficiency of utilizing the light.

Further, the light source is constructed by the LED 17. In accordance with this, it is possible to achieve a higher brightness and a lower electric power consumption.

Second Embodiment

Figure 11:
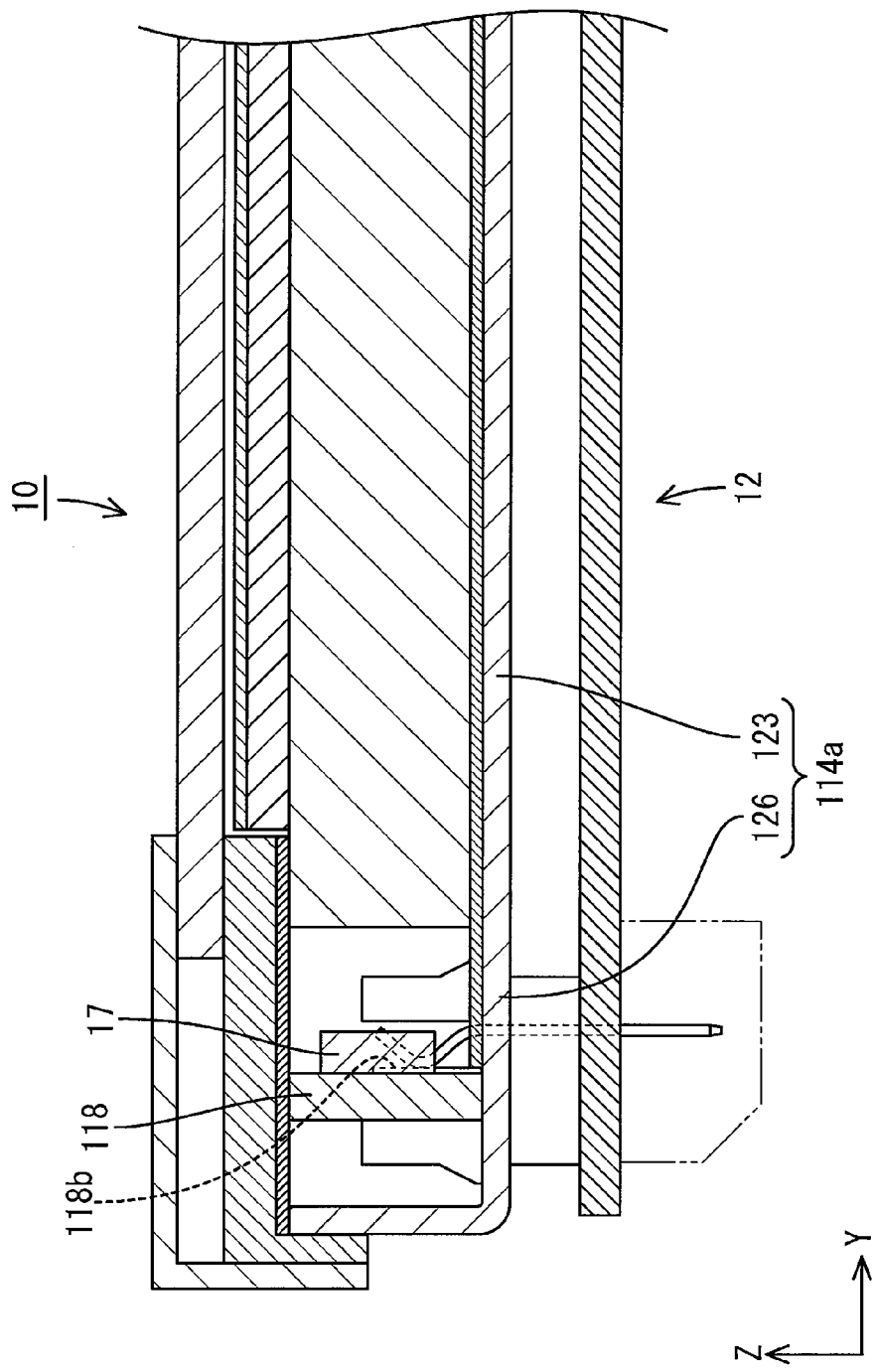
FIG. 11 is a cross sectional view along a line xi-xi in FIG. 10.
Figure 12:
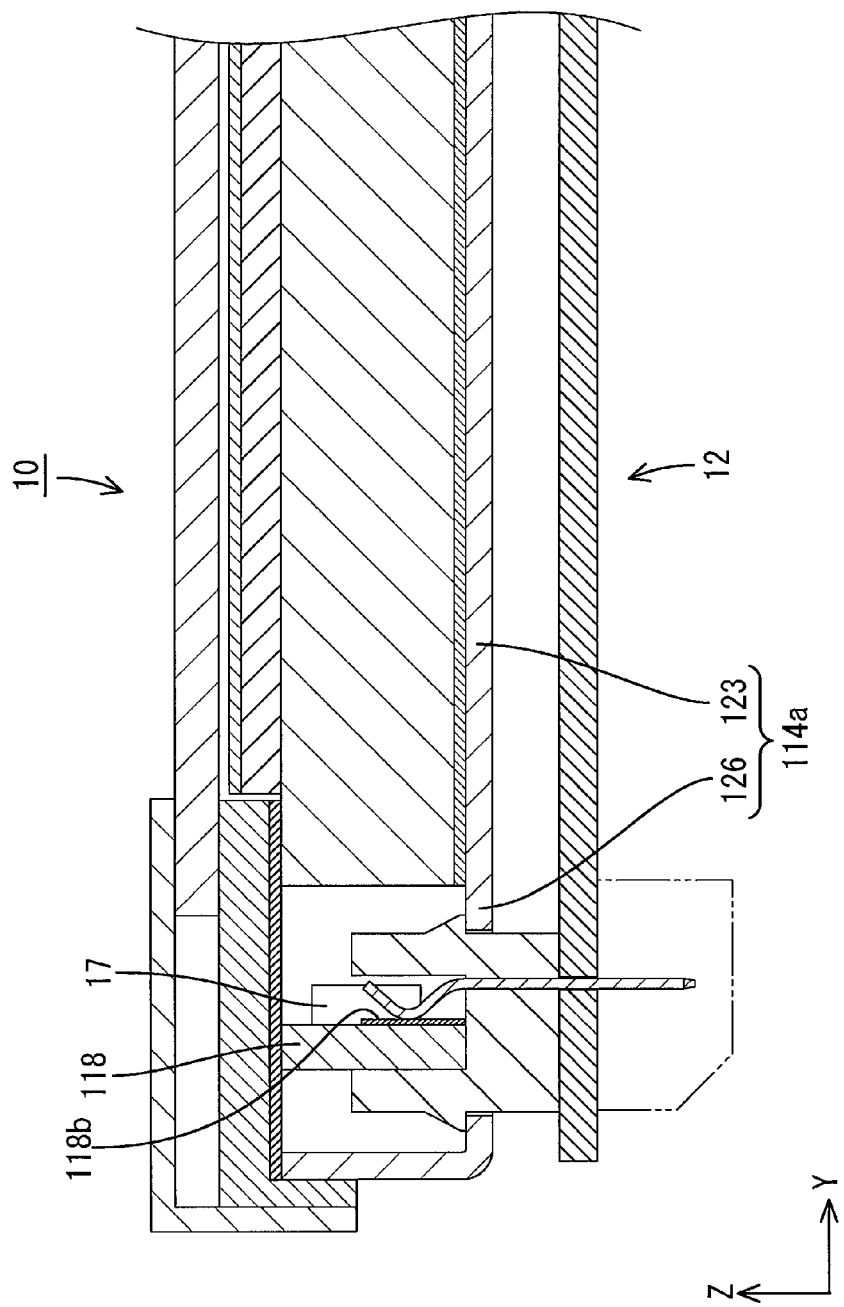
FIG. 12 is a cross sectional view along a line xii-xii in FIG. 10.

A description will be given of a second embodiment in accordance with the present invention with reference to FIGS. 10 to 12. In this second embodiment, there is shown a structure in which an arrangement of a terminal 118b is changed. In this case, with regard to the same structures, operations and effects as those of the first embodiment mentioned above, an overlapping description will be omitted.

Figure 10:
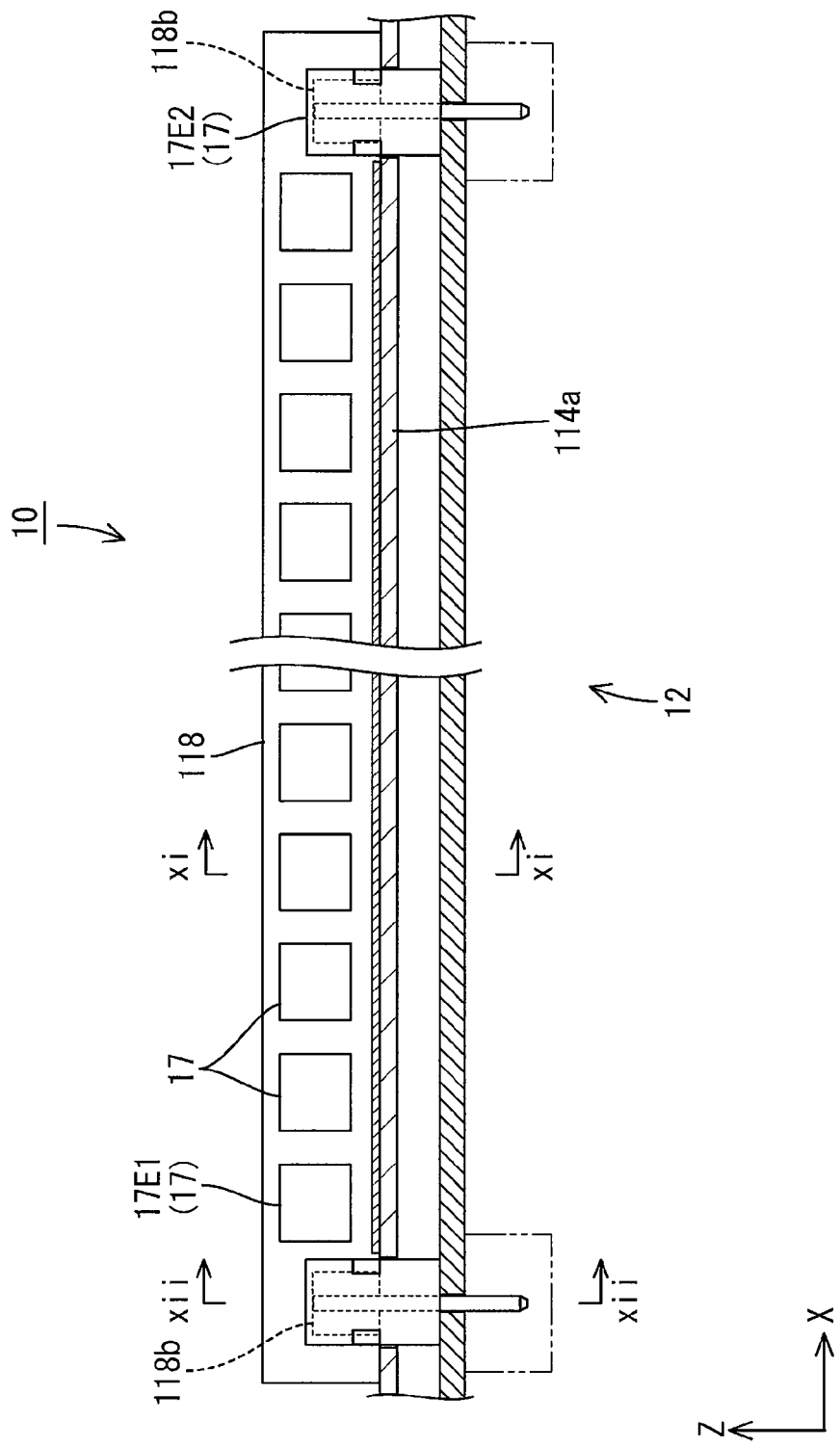
FIG. 10 is a cross sectional view showing a cross sectional configuration of an LED board, a chassis, a connector and a power supply circuit board in accordance with a second embodiment of the present invention.

The terminal 118b is arranged at a position displaced from the LED 17 in a long-side direction (a direction of an X-axis) of an LED board 118, as shown in FIG. 10. In detail, the terminal 118b is arranged closer to an end than the LEDs 17E1 and 17E2 which are positioned in an end in the long-side direction in the LED board 18, and is arranged parallel to the LEDs 17E1 and 17E2 in the X-axis direction. It can be said that the terminal 118b is arranged so as to overlap in a Z-axis direction with respect to the LED 17 as shown in FIGS. 11 and 12. In accordance with this, it is possible to make a dimension of a short side of the LED board 118 smaller in comparison with the first embodiment mentioned above. Accordingly, it is possible to make smaller (that is, thinner) the backlight unit 12 and the liquid crystal display device 10 in the Z-axis direction. In this case, a bottom plate 114a is formed in a flat shape over all the region from a light guide member support portion 123 to a connector mount portion 126.

As mentioned above, in accordance with the present embodiment, the terminal 118b is arranged at the position displaced from the LED 17 in the long-side direction of the LED board 118 with respect to the LED 17. In accordance with this, in comparison with the case that the terminal 18b and the LED 17 are arranged so as to be displaced each other in the short-side direction of the LED board 18 as in the first embodiment, it is possible to downsize the LED board 118 in the short-side direction. In accordance with this, it is possible to make the entire backlight unit 12 thinner.

Other Embodiment

The present invention is not limited to the above embodiments explained in the above description. The following embodiments, for example, may be included in the technical scope of the present invention.

Figure 13:
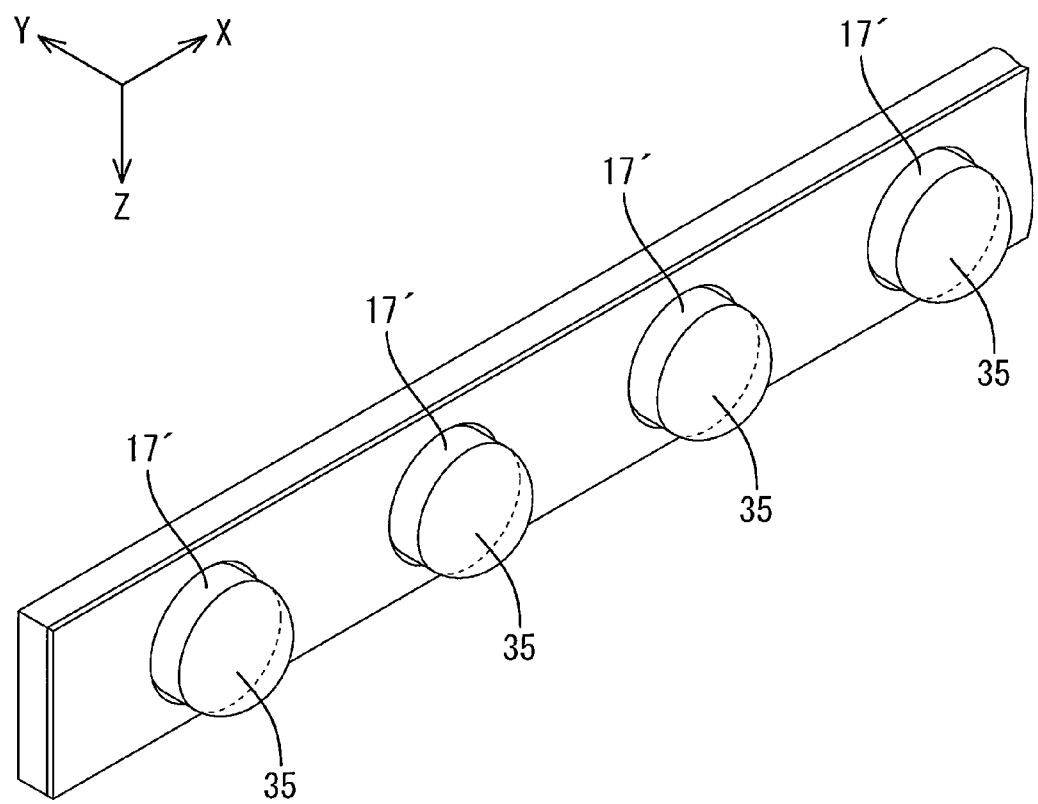
FIG. 13 is a perspective view of an LED board in accordance with another embodiment (1) of the present invention.

(1) The LED mounted to the LED board can be structured as follows. A light emitting surface side of an LED 17' is provided with a lens member 35 for outputting the light while diffusing at a wide angle as shown in FIG. 13. The lens member 35 is interposed between the LED 17' and the light incident surface of the light guide member, and a light output surface thereof is formed in a spherical shape so as to be concave to the light guide member side.

(2) In each of the embodiments mentioned above, there is shown the structure in which the LED board is sandwiched between a pair of walls of the connector; however, the inner wall portion can be omitted, for example. On the contrary, the outer wall portion can be omitted. In this case, the LED board may be received, for example, by the side plate of the chassis.

(3) In each of the embodiments mentioned above, there is shown the structure in which the terminal is formed wider in the long-side direction of the LED board than the elastic contact part; however, a structure in which the elastic contact part is formed wider in the long-side direction of the LED board than the terminal is included in the present invention.

(4) In each of the embodiments mentioned above, there is shown the structure in which the LED board is of the single-sided type; however, it can be of a both-sided type. In this case, the LED may be formed on one surface of the LED board, and the terminal may be formed on the other surface, respectively.

(5) In each of the embodiments mentioned above, there is shown the structure in which the insertion groove is open to both the Z-axis direction and the X-axis direction; however, the insertion groove can be formed so as to be closed in the X-axis direction, and be open only to the Z-axis direction.

(6) In the first embodiment mentioned above, there is shown the structure in which the terminals are arranged so as to be lined up in the Z-axis direction with respect to the LED, that is, arranged so as to approximately coincide in the X-axis direction; however, a structure in which the terminals are arranged at positions displaced from the LED in the X-axis direction is included in the present invention. In addition, for example, a structure in which the terminals are arranged so as to be lined up in the Z-axis direction with respect to the LED positioned close to the center, rather than the LED positioned at the end in the long-side direction in the LED board is included in the present invention.

(7) In each of the embodiments mentioned above, there is shown the case of using the LED of the type that has the built-in blue LED chip emitting the single blue light, and emits the approximately white light by the fluorescent material; however, a structure using an LED of a type that has a built-in LED chip emitting a single ultraviolet light (a lavender light) built-in, and emits the approximately white light by the fluorescent material is included in the present invention.

(8) In each of the embodiments mentioned above, there is shown the case of using the LED of the type that has the built-in LED chip emitting the single blue color and emits the approximately white light by the fluorescent material; however, a structure using an LED of a type that has three kinds of built-in LED chips emitting a red light, a green light and a blue light, respectively, is included in the present invention. In addition, a structure using an LED of a type that has three kinds of built-in LED chips emitting a cyan light (C), a magenta light (M) and a yellow light (Y), respectively, is included in the present invention.

(9) In each of the embodiments mentioned above, there is shown the structure in which a pair of LED boards (LEDs) is arranged in the end portions in both the long sides in the chassis (the light guide member); however, a structure in which a pair of LED boards (LEDs) is arranged in the end portions in both the short sides in the chassis (the light guide member) is included in the present invention, for example.

(10) In addition to the item (9) mentioned above, a structure in which a pair of LED boards (LEDs) is arranged in the end portions of each of both the long sides and both the short sides in the chassis (the light guide member), and a structure in which one LED board (LED) is arranged only in the end portion of one long side or one short side in the chassis (the light guide member) are also included in the present invention.

(11) In the embodiment mentioned above, the TFT is used as the switching component of the liquid crystal display device; however, it is possible to apply the invention to a liquid crystal display device which uses switching components (for example, a thin-film diode (TFD)) other than the TFT, and it is possible to apply the invention to a liquid crystal display device which carries out a monochrome display in addition to the liquid crystal display device which carries out a color display.

(12) In each of the embodiments mentioned above, there is exemplified the liquid crystal display device which uses the liquid crystal panel as the display panel; however, the present invention can be applied to a display device which uses other kinds of display panel.

(13) In each of the embodiments mentioned above, there is exemplified the television receiver which is provided with the tuner; however, the present invention can be applied to a display device which is not provided with the tuner.

EXPLANATION OF SYMBOLS

10: Liquid crystal display device (Display device)
11: Liquid crystal panel (Display panel)
12: Backlight unit (Lighting device)
14: Chassis
14a: Bottom plate (Bottom portion)
14c: Mounting hole
17: LED (Light source)
18: LED board (Light source board)
18a: Wiring pattern
18b: Terminal
19: Light guide member
20: Connector
22: First reflection sheet (Reflection member)
23: Light guide member support portion
24: Second reflection sheet (Reflection member)
26: Connector mount portion
27: Connector housing
28: Connection terminal
29: Insertion groove
30: Outer wall portion (Wall portion)
31: Inner wall portion (Wall portion)
33: Elastic contact part
TV: Television receiver

The invention claimed is:

1. A lighting device comprising:
an elongated light source board including a light source;
a chassis housing the light source board;
a light guide member having an end portion arranged opposite to the light source of the light source board; and a connector mounted to the chassis and configured to establish electrical connection with an external device, the connector holding the light source board, wherein:
the light source board includes a terminal electrically connected to the light source; and
the connector includes a connection terminal being in contact with the terminal of the light source board and slidable along a long-side direction of the light source board and relative to the terminal of the light source board.

2. The lighting device according to claim 1, wherein the terminal has a dimension wider than a dimension of the connection terminal, the dimension of the terminal and the dimension of the connection terminal measuring in the long-side direction of the light source board.

3. The lighting device according to claim 1, wherein the connector has a pair of walls arranged opposite to each other such that an insertion groove is provided between the walls for receiving the light source board.

4. The lighting device according to claim 3, wherein the connection terminal has a contact portion that is in contact with the terminal, the contact portion being shaped so as to project from one of the walls toward the light source board.

5. The lighting device according to claim 3, wherein the insertion groove has an opening extending along a short-side direction of the light source board.

6. The lighting device according to claim 5, wherein the connector has a receiving surface at a bottom of the insertion groove, the receiving surface receiving the light source board.

7. The lighting device according to claim 3, wherein the insertion groove has an opening extending along the long-side direction of the light source board.

8. The lighting device according to claim 1, wherein the light source board includes a plurality of the light sources arranged parallel to each other in the long-side direction and has a wiring pattern connecting the light sources in series.

9. The lighting device according to claim 8, wherein:
the terminal includes a plurality of terminals arranged at one of ends of the light source board and the other end portion side in the long-side direction in the light source board; and
the connector includes a pair of connectors, the connectors being arranged at different locations away from each other in the long-side direction so as to correspond to the terminals.

10. The lighting device according to claim 1, wherein the terminal is arranged at a position displaced from the light source in the short-side direction of the light source board with respect to the light source.

11. The lighting device according to claim 10, wherein the terminal is arranged parallel to the light source in the short-side direction.

12. The lighting device according to claim 11, wherein:
the light source board includes a plurality of the light sources and a wiring pattern, the light sources being arranged parallel to each other in the long-side direction, the wiring pattern connecting the light sources in series; and the terminal is arranged parallel to the light source in the short-side direction, the light source being at an end of the long side of the light source board short-side direction long-side direction.

13. The lighting device according to claim 10, wherein:
the light source is arranged on the light source board closer to a first end of the short-side direction of the light source board; and
the terminal is arranged on the light source board closer to a second end of the short-side direction of the light source board.

14. The lighting device according to claim 13, wherein the connector holds the second end of the short-side direction of the light source board.

15. The lighting device according to claim 14, wherein:
the chassis has a bottom portion to which the connector is mounted, the bottom portion being arranged away from a light output side with respect to the light source board and the light guide member;
the bottom portion has a light guide member support portion and a connector mount portion, the light guide member support portion supporting the light guide member; and
the connector mount portion to which the connector is mounted protrudes further outside than the light guide member support portion.

16. The lighting device according to claim 15, wherein the connector is arranged at a position displaced from the light guide member in the short-side direction of the light source board.

17. The lighting device according to claim 1, wherein the terminal is arranged at a position displaced from the light source in the long-side direction of the light source board.

18. The lighting device according to claim 1, wherein the terminal arranged on a surface of the light source board on which the light source is arranged.

19. The lighting device according to claim 1, wherein the connection terminal has an elastic contact part which is in elastic contact with the terminal.

20. The lighting device according to claim 1, wherein the chassis has a mounting hole through which the connector is passed such that the connector is fitted therein.

21. The lighting device according to claim 1, wherein the connector has a connector housing that includes the connection terminal therein and has an insulating property.

22. The lighting device according to claim 21, wherein:
the connector housing is made of a synthetic resin; and
the connection terminal is inserted into the connector housing.

23. The lighting device according to claim 1, further comprising a pair of reflection members, wherein
the light source and the end portion of the light guide member arranged opposite to the light source are arranged away from each other with a space therebetween, the space is sandwiched between the reflection members.

24. The lighting device according to claim 1, wherein the light source is an LED.

25. A display device comprising:
the lighting device according to claim 1; and
a display panel configured to provide display using light from the lighting device.

26. The display device according to claim 25, wherein the display panel is a liquid crystal panel including liquid crystals sealed between a pair of substrates.

27. A television receiver comprising the display device according to claim 25.

* * * * *